United States Patent
Cichanowicz

(10) Patent No.: US 7,776,297 B2
(45) Date of Patent: Aug. 17, 2010

(54) MULTI-STAGE HEAT ABSORBING REACTOR AND PROCESS FOR SCR OR NOX AND FOR OXIDATION OF ELEMENTAL MERCURY

(76) Inventor: J. Edward Cichanowicz, P.O. Box 905, Saratoga, CA (US) 95071

(*) Notice: Subject to any disclaimer, the term of this patent is extended or adjusted under 35 U.S.C. 154(b) by 1057 days.

(21) Appl. No.: 11/141,036

(22) Filed: Jun. 1, 2005

(65) Prior Publication Data
US 2005/0232838 A1 Oct. 20, 2005

Related U.S. Application Data

(63) Continuation-in-part of application No. PCT/US2004/038222, filed on Dec. 1, 2004, and a continuation-in-part of application No. 10/927,461, filed on Aug. 27, 2004, now Pat. No. 7,438,876, and a continuation-in-part of application No. 10/725,057, filed on Dec. 2, 2003, now Pat. No. 7,198,769.

(51) Int. Cl.
B01D 53/86 (2006.01)
B01D 53/56 (2006.01)
B01J 8/00 (2006.01)
C01B 21/00 (2006.01)

(52) U.S. Cl. .................... 423/239.1; 423/239.2
(58) Field of Classification Search ............ 423/239.1, 423/239.2
See application file for complete search history.

(56) References Cited

U.S. PATENT DOCUMENTS

| 4,160,009 A * | 7/1979 | Hamabe ............... 422/108 |
| 4,903,755 A * | 2/1990 | Michelfelder et al. ...... 165/7 |
| 4,938,939 A * | 7/1990 | Kuznicki .............. 423/326 |
| 5,540,897 A * | 7/1996 | Chu et al. ............. 422/177 |
| 2003/0170159 A1* | 9/2003 | Honjo et al. ........... 423/210 |

OTHER PUBLICATIONS

Sigling et al., Enhance Ammonia Distribution for Maximum SCR Performance, Oct. 14, 2003, Institute of Clean Air Companies, Forum 2003.*

* cited by examiner

Primary Examiner—David M Brunsman
Assistant Examiner—Kevin M Johnson

(57) ABSTRACT

A selective catalytic reduction apparatus has at least first and last catalyst layers in series for reducing nitrogen oxides in a flue gas, at least one interstage heat exchanger located after the first layer and before the last layer, that lowers flue gas temperature, and that acts as a mixing body to lower the standard deviation of the $NH_3/NO$ ratio entering catalyst layers after the first catalyst layer, thus providing better consumption of both ammonia and NOx in the reactor than would be achieved in the absence of the at least one interstage heat exchanger.

21 Claims, 19 Drawing Sheets

Two Stage
SCR Process Reactor
With Boiler Water/Steam
Heat Exchanger to boiler water/steam water supply or boiler water/steam

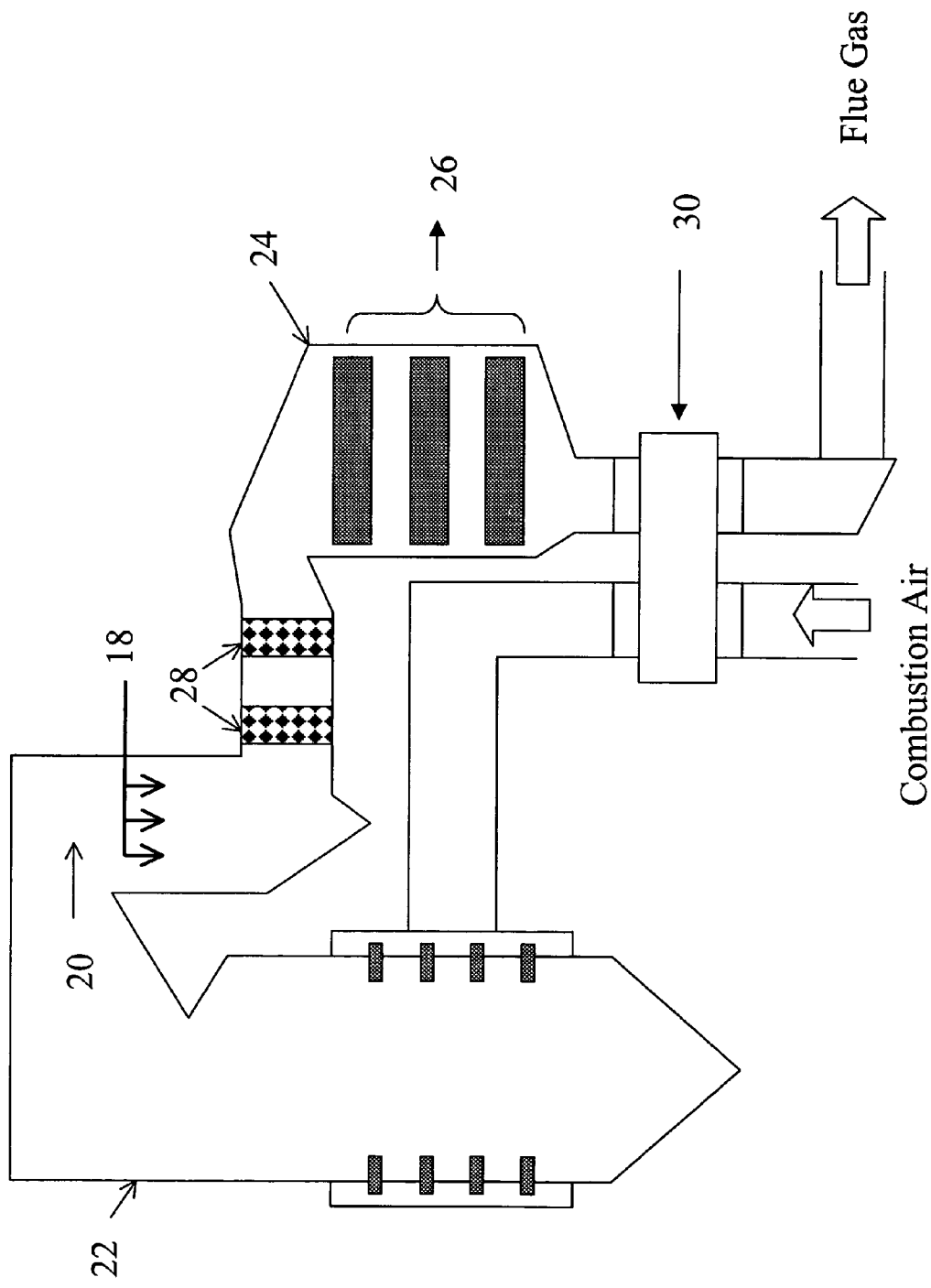
Figure 1: Conventional SCR Process Arrangement

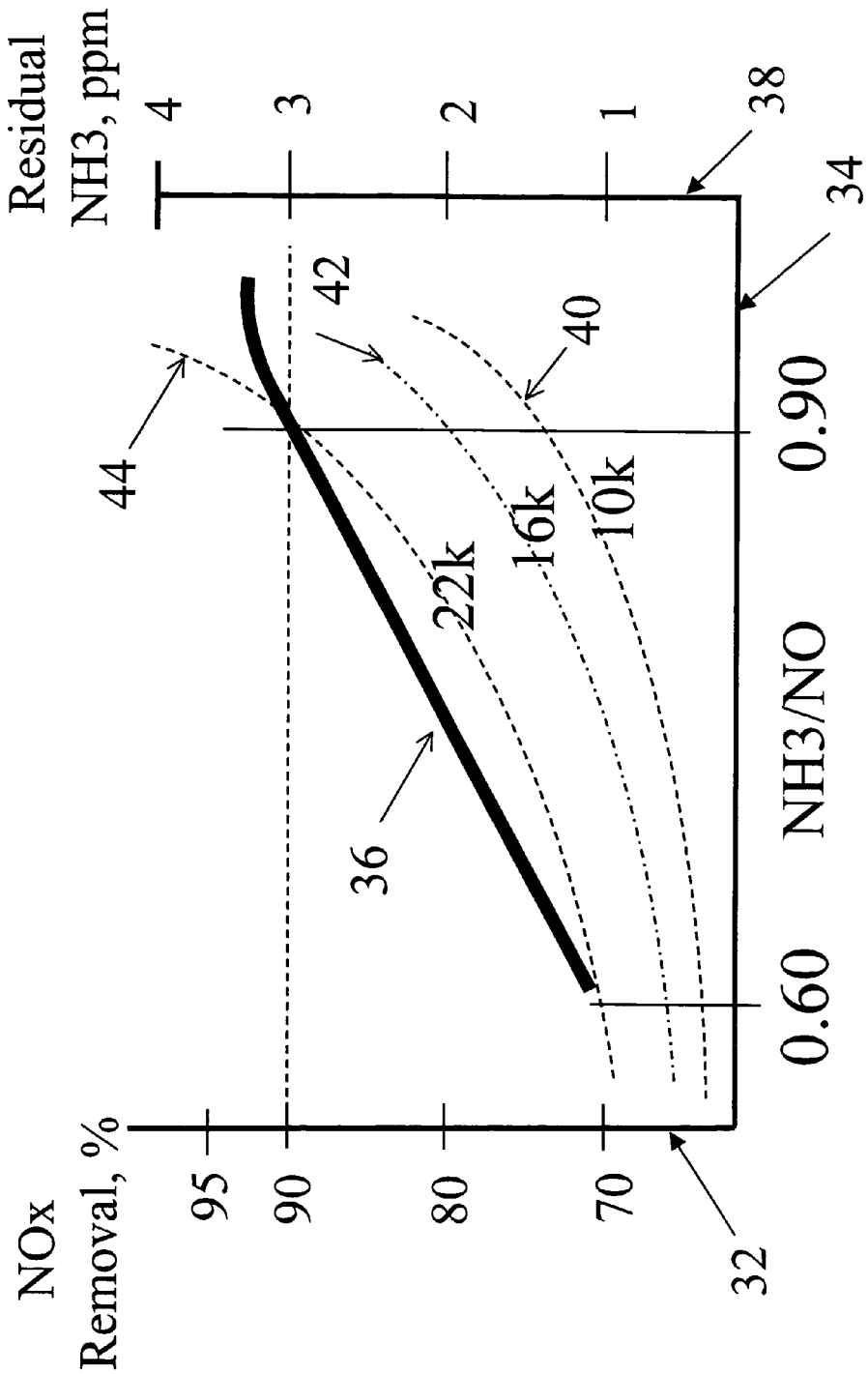
Figure 2: Typical SCR NOx Removal and Residual NH3

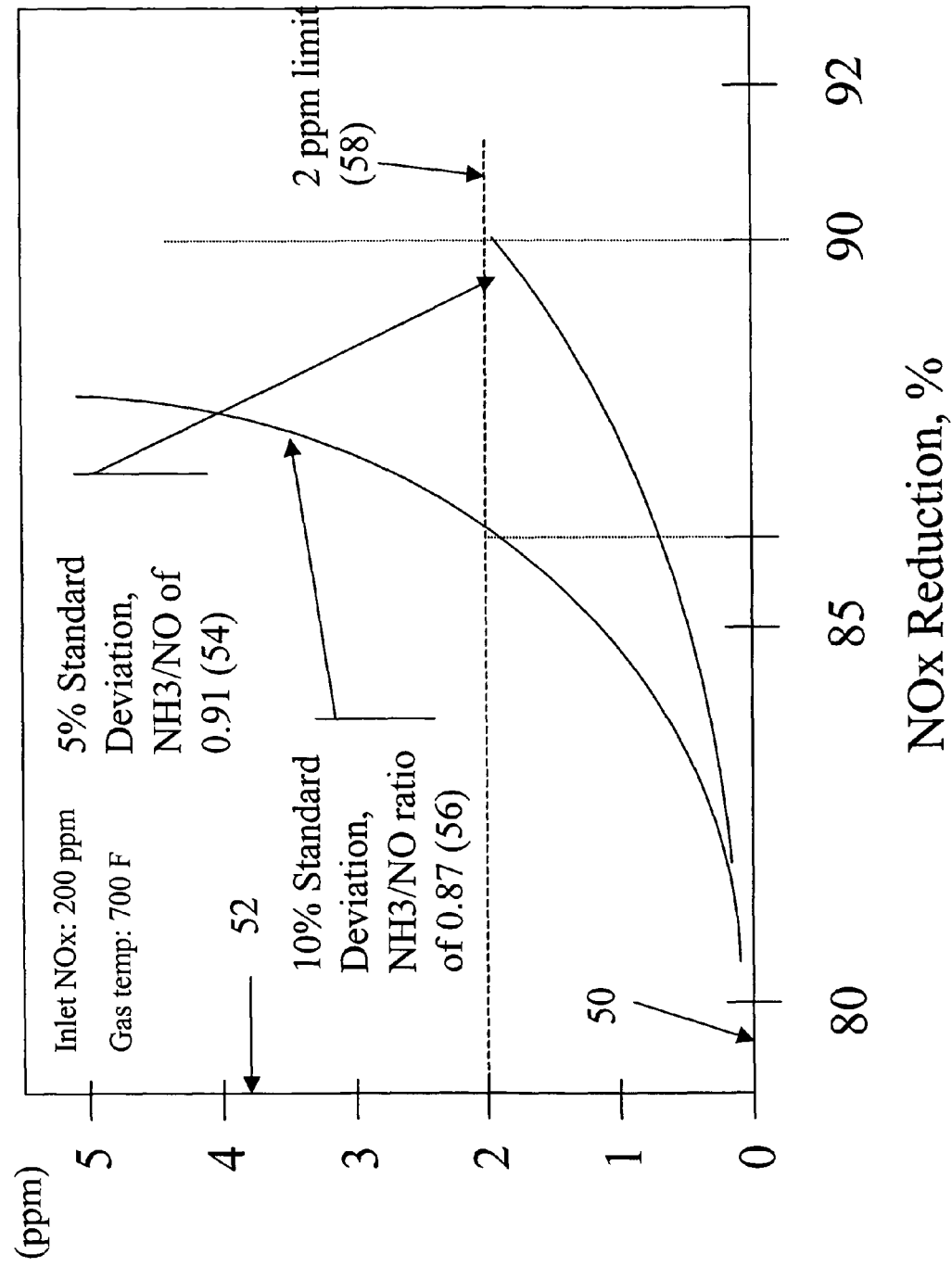
Figure 3: NH3/NO Ratio Non-Uniformity Effects on NOx Removal Performance Figure 4. SCR Process Conditions Across The Reactor and Each of Three Catalyst Layers

| | NOx Removal (%) | NOx (ppm) | NH3 (ppm) | Overall NH3/NO Ratio | NH3 Deviation (ppm) | NH3/NO Standard Deviation Entering Layer | SO3 Created by SCR (ppm) | ABS Onset Temp, F |
|---|---|---|---|---|---|---|---|---|
| Process Inlet | | 200 | 182 | 0.91 | 9 | 5% | 15 | 575 |
| Layer 1 | | | | | | | | |
| Across | 68% | | | | | | | |
| Exit | | 136 | 136 | 0.72 | 9 | 14% | 21 | 450 |
| Layer 2 | | | | | | | | |
| Across | 19% | | | | | | | |
| Exit | | 64 | 46 | | | | | |
| | | 38 | 38 | 0.31 | 9 | 35% | 31 | 430 |
| Layer 3 | | | | | | | | |
| Across | 3% | | | | | | | |
| Exit | | 26 | 8 | | | | | |
| | | 6 | 6 | 0.10 | 9 | 46% | 45 | 390 |
| | | 20 | 2 | | | | | |

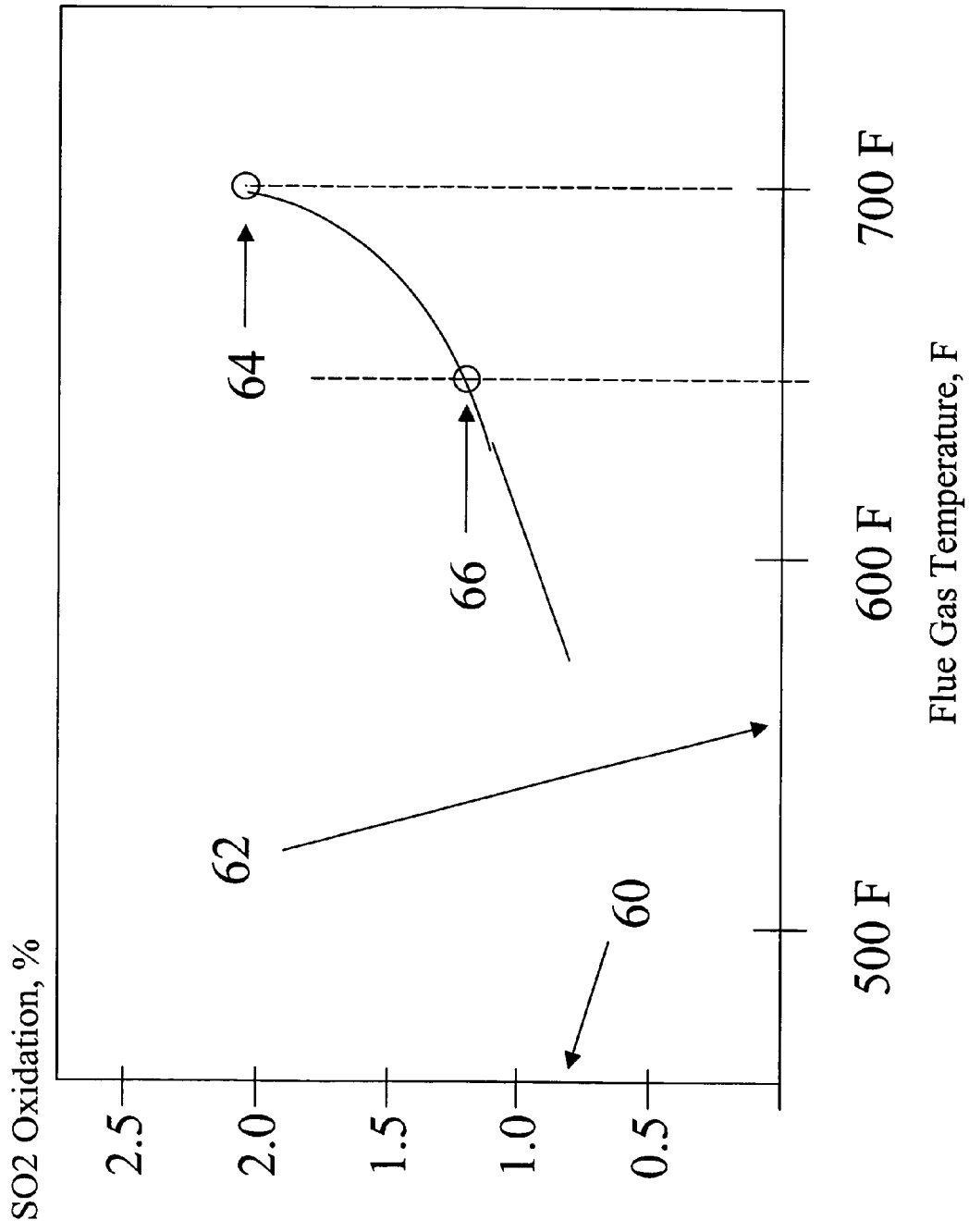
Figure 5: The Influence of Gas Temperature on SO2 Oxidation

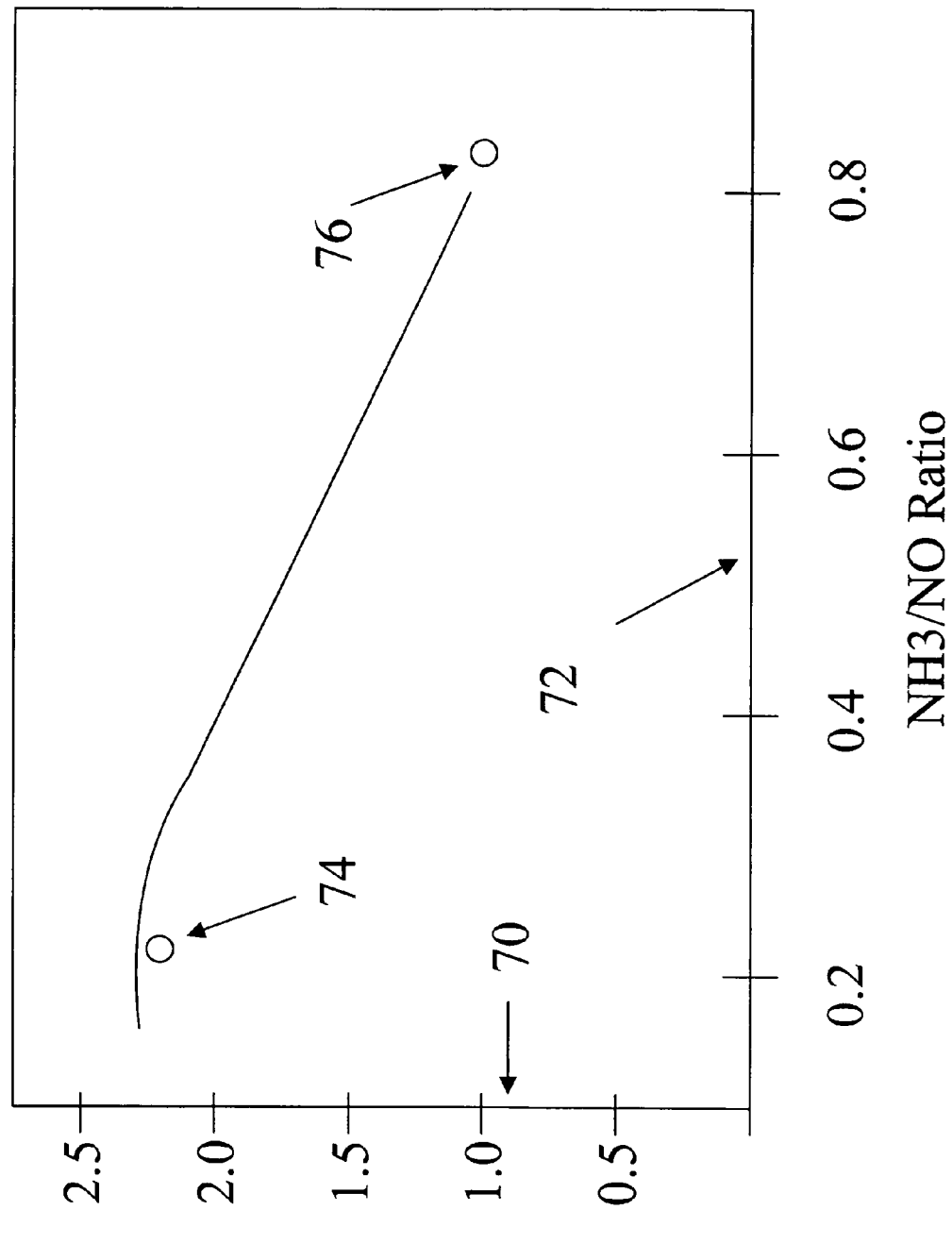
Figure 6: SO2 Oxidation As a Function of NH3/NO Ratio

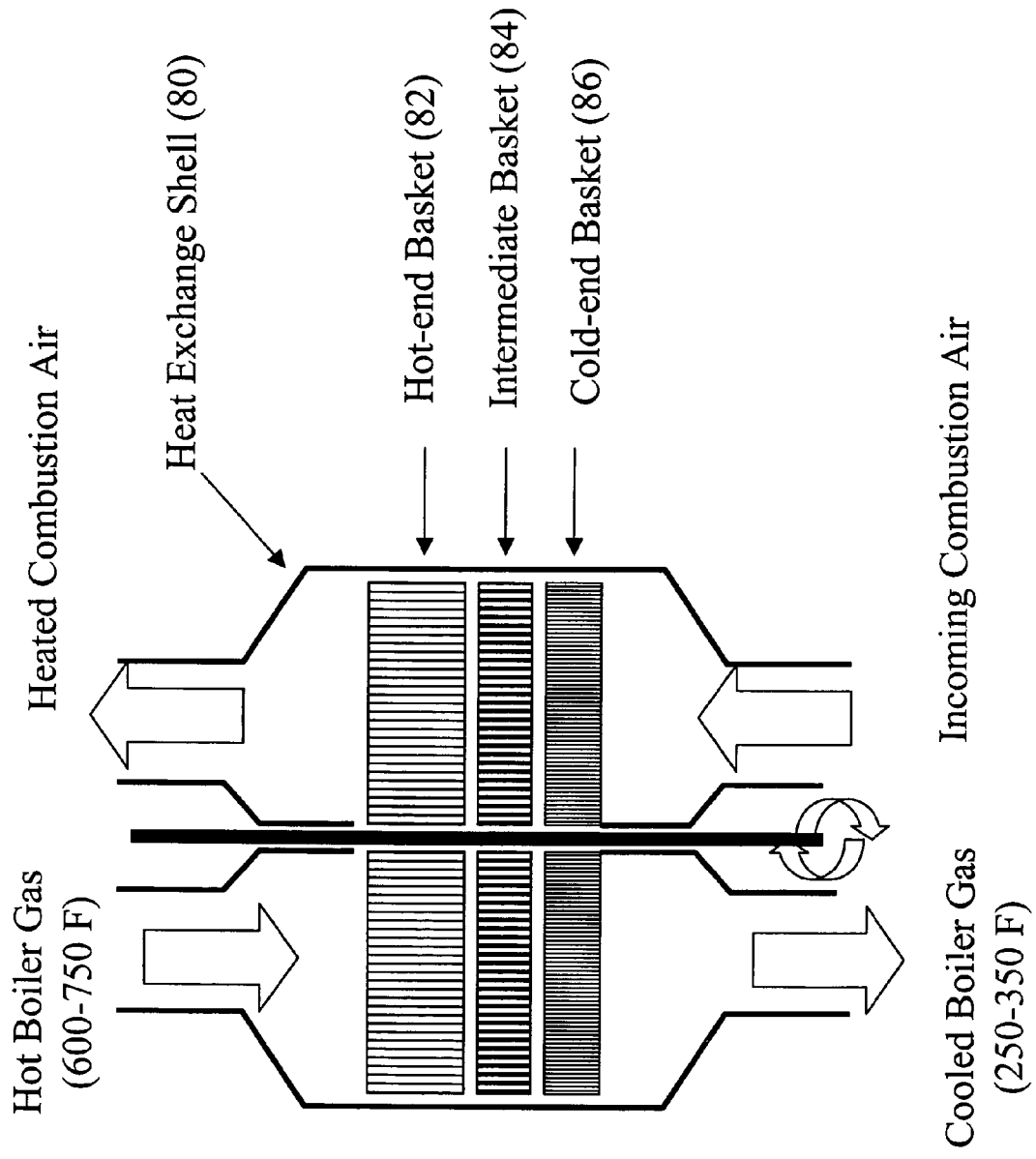
Figure 7: Conventional Ljungstrom-type Air Heater

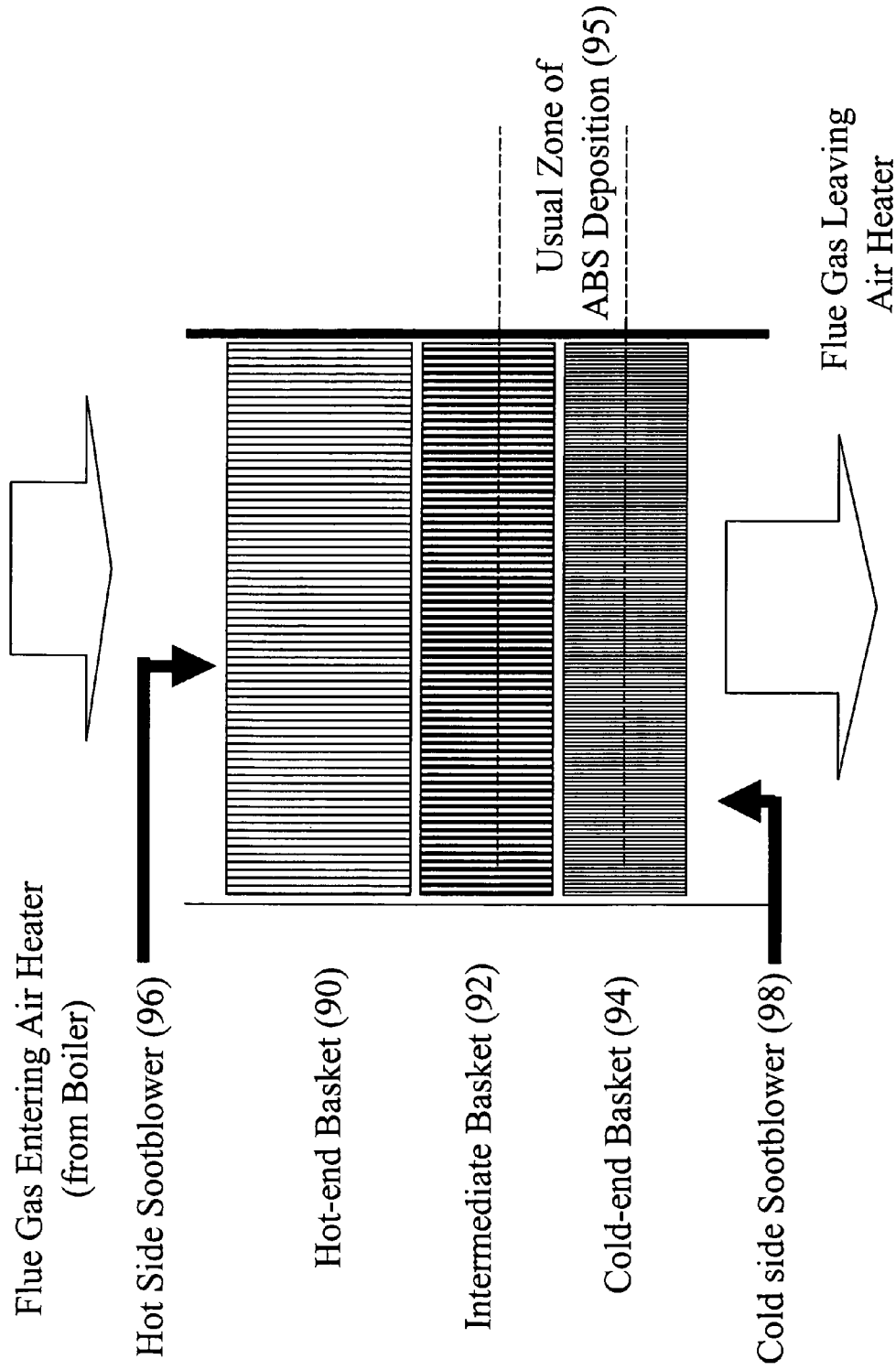
Figure 8: Detail of Heat Exchange Surfaces

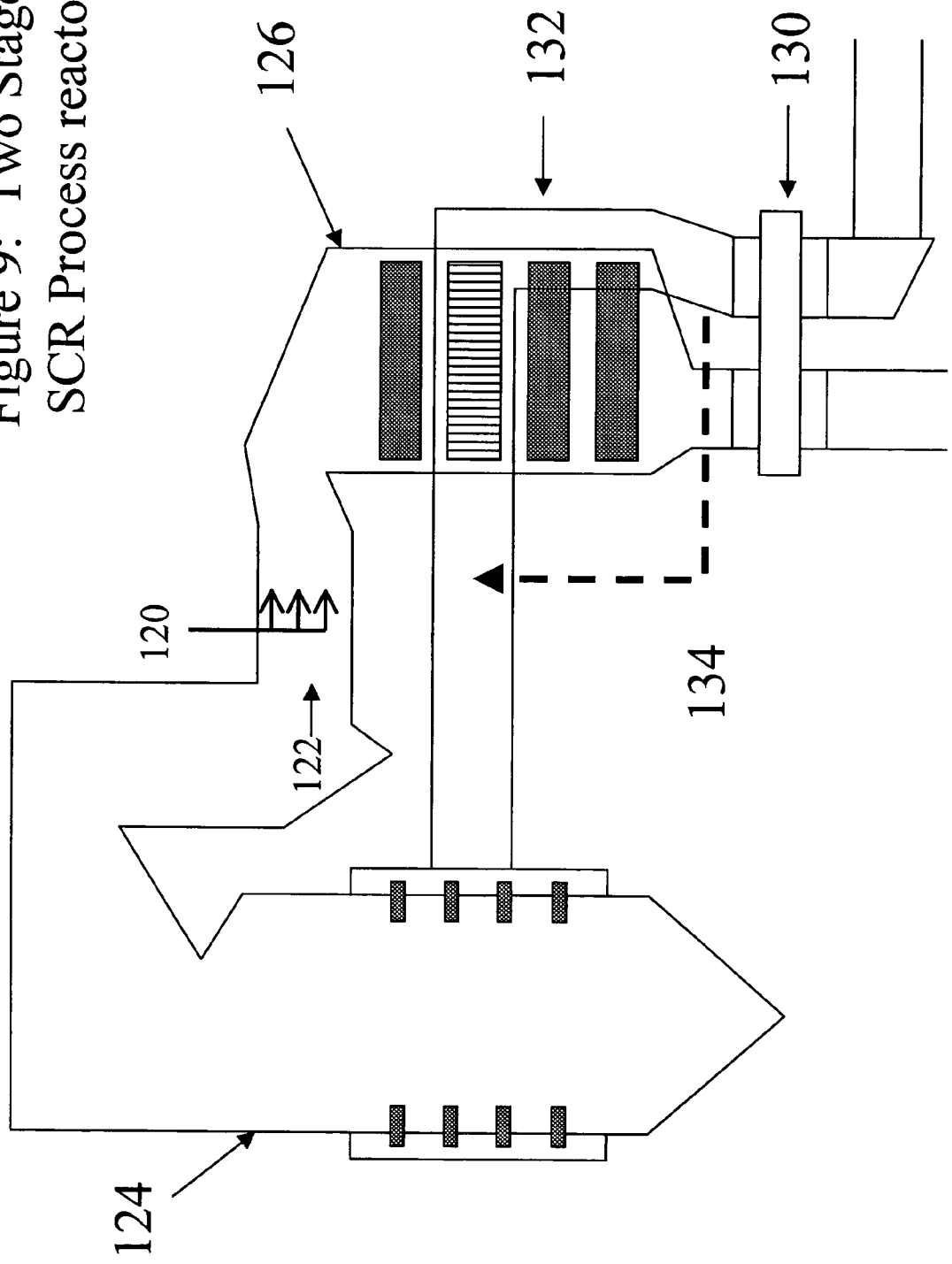
Figure 9: Two Stage SCR Process reactor

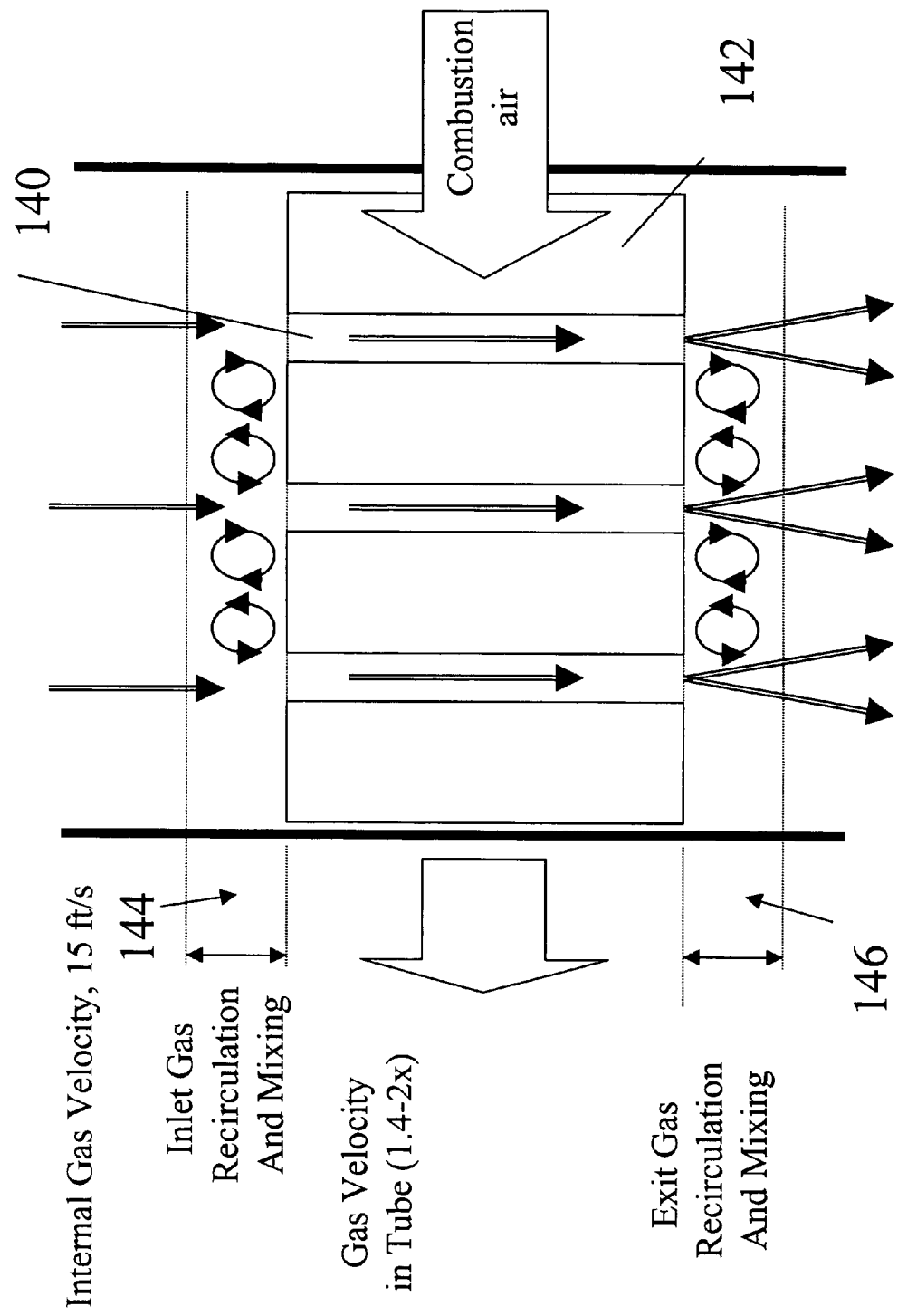
Figure 10: Flue Gas Flow Entering and Exiting The Tube-Type Heat Exchanger

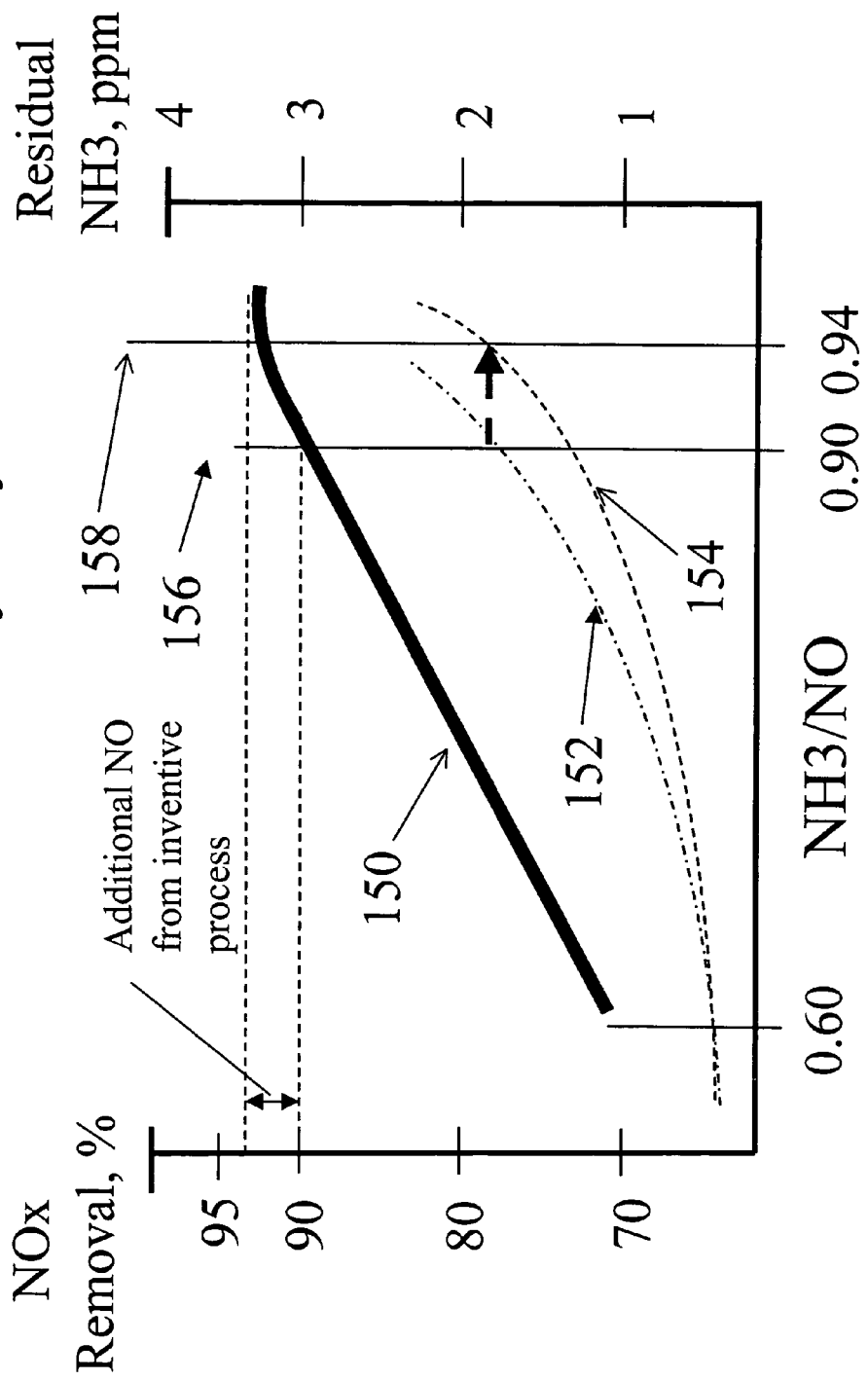
Figure 11: Improvement in NOx Removal Due To Reduction in Standard Deviation of NH3/NO After The First Catalyst Layer Figure 12. SCR Process Conditions Across The Reactor and Each of Three Catalyst Layers: Conventional vs. Inventive Process

| | NOx Removal (%) | NOx (ppm) | NH3 (ppm) | NH3/NO | NH3 Deviation (ppm) | Residual NH3 at NOx Reduction, ppm Design | Residual NH3 at NOx Reduction, ppm Inventive Process | Standard Deviation At Entrance to Reactor or Layer (%) Conventional Design | Standard Deviation At Entrance to Reactor or Layer (%) Inventive Process | Flue SO3 (ppm) Conventional Design | Flue SO3 (ppm) Inventive Process | ABS Onset Temp, F Conventional Design | ABS Onset Temp, F Inventive Process |
|---|---|---|---|---|---|---|---|---|---|---|---|---|---|
| Process Inlet | | 200 | 182 | 0.91 | 9 | n/a | n/a | 5% | 5% | 15 | 15 | 575 | 575 |
| Layer 1 | | | | | | | | | | | | | |
| Across | 68% | 136 | 136 | 0.72 | 9 | 50 | 50 | 14% | 10% | 21 | 21 | 450 | 450 |
| Exit | | 64 | 46 | | | | | | | | | | |
| Layer 2 | | | | | | | | | | | | | |
| Across | 19% | 38 | 38 | 0.31 | 9 | 12 | 7 | 35% | 20% | 31 | 25 | 430 | 425 |
| Exit | | 26 | 8 | | | | | | | | | | |
| Layer 3 | | | | | | | | | | | | | |
| Across | 3% | 6 | 6 | 0.10 | 9 | 6 | 2 | 46% | 28% | 45 | 29 | 390 | 380 |
| Exit | | 20 | 2 | | | | | | | | | | |

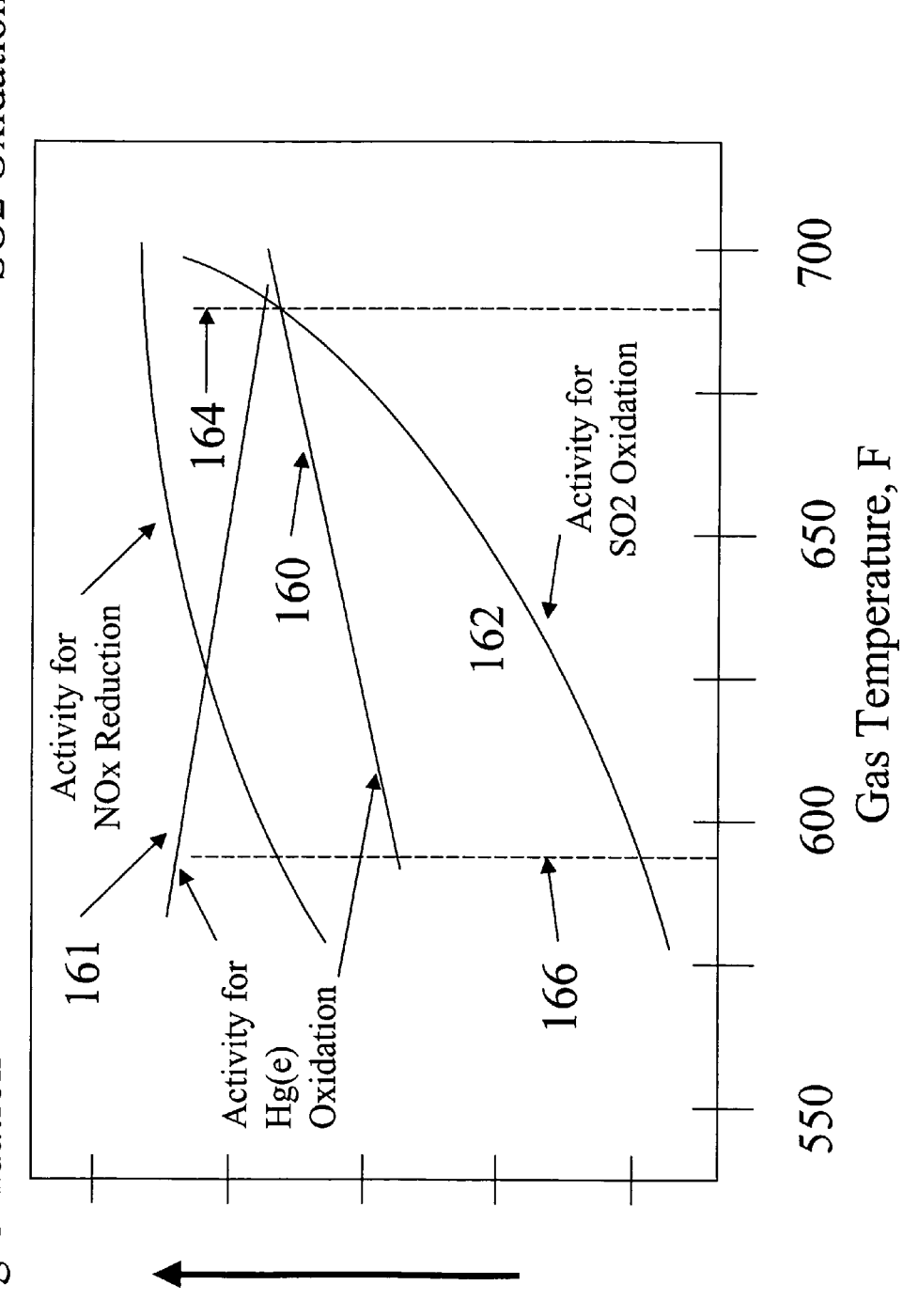
Figure 13. Relative Oxidation of Hg and SO2

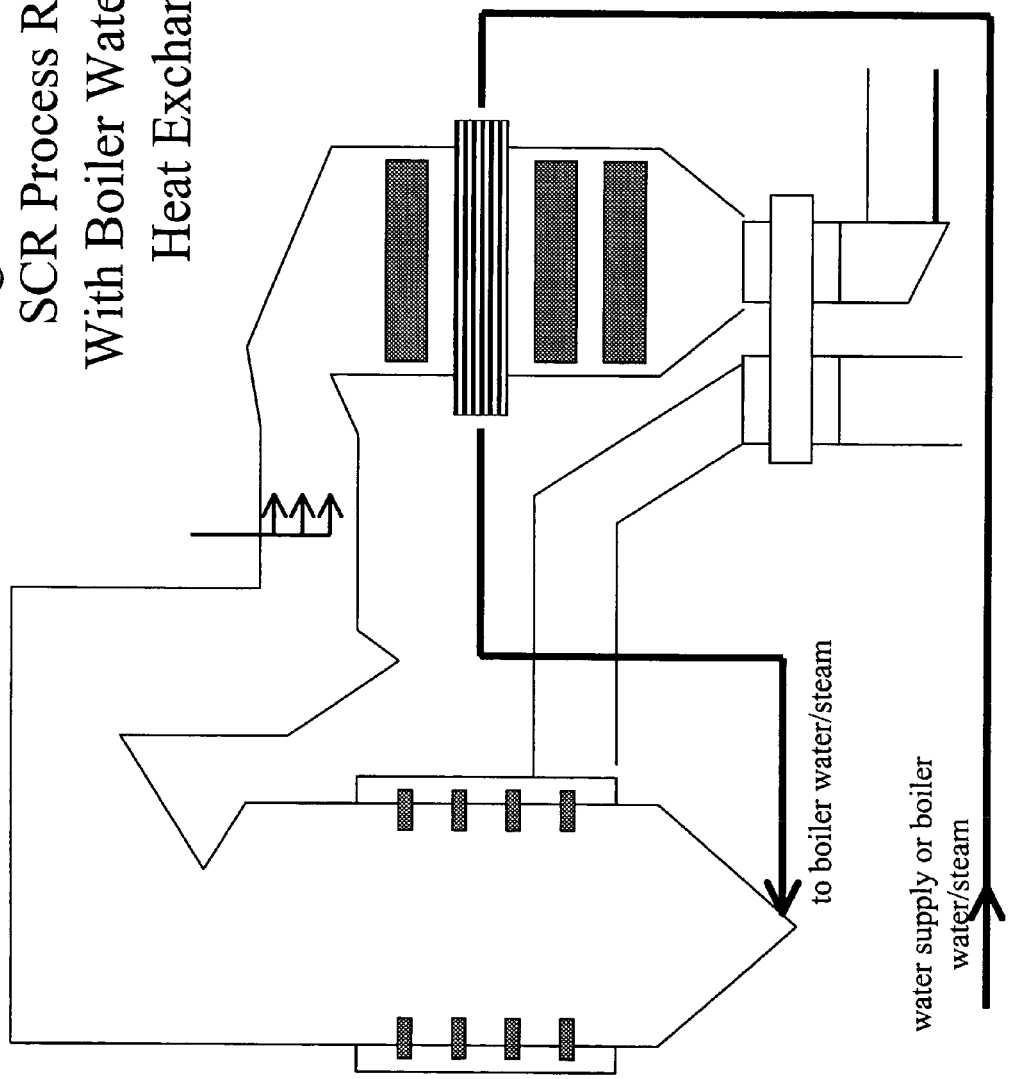
Figure 14: Two Stage SCR Process Reactor With Boiler Water/Steam Heat Exchanger

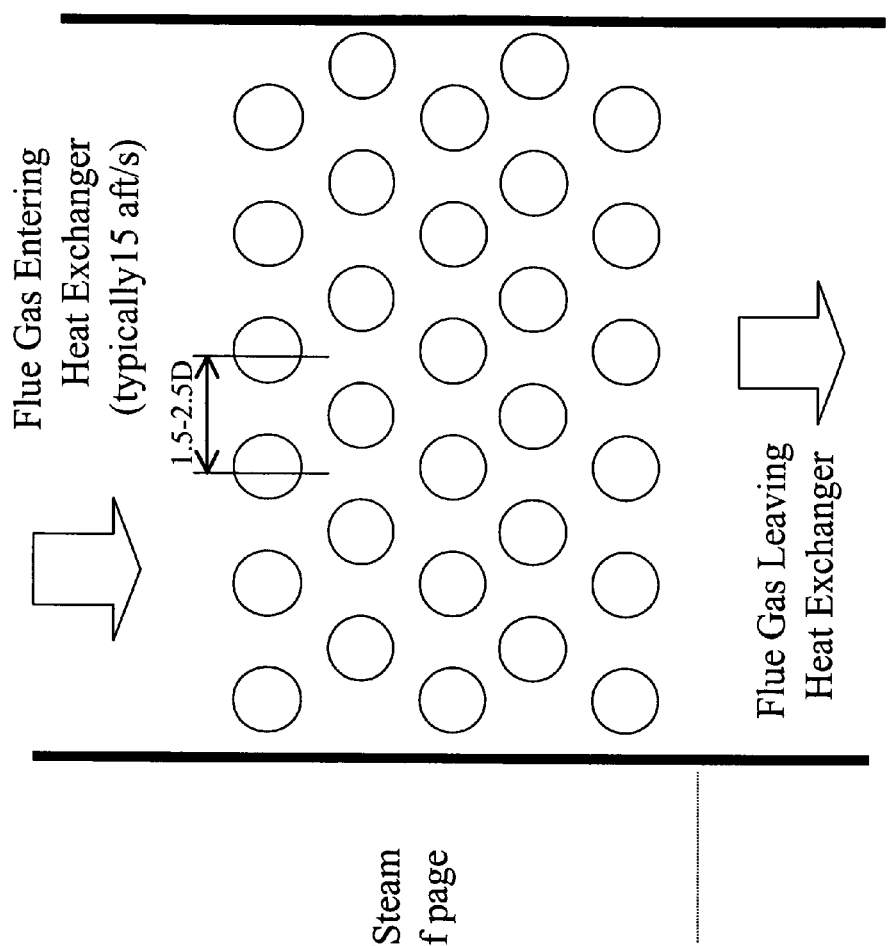
Figure 15: Flue Gas Flow Entering and Exiting The Tube-Type Heat Exchanger

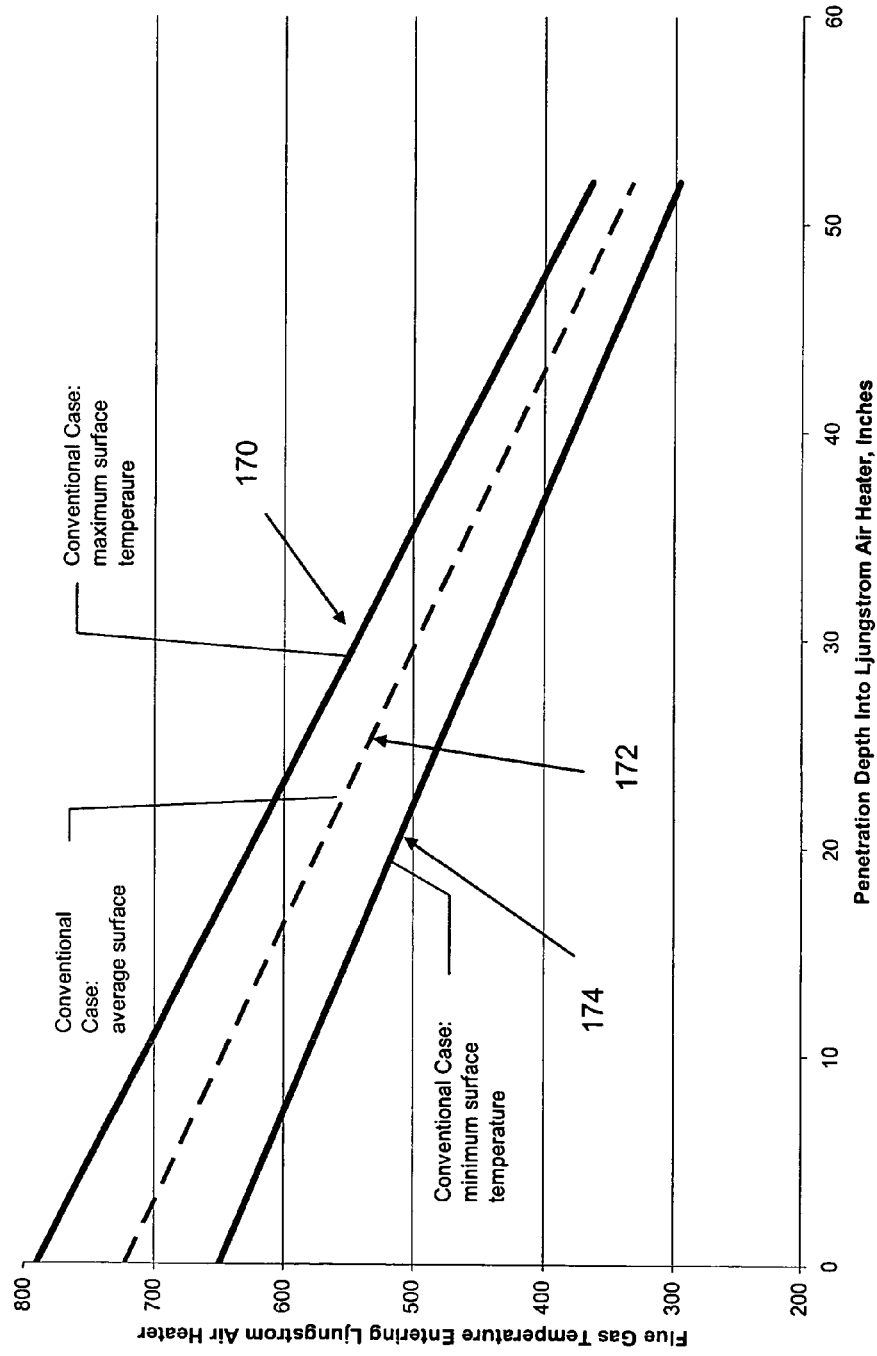
Figure 16: Air Heater Metal Temperature vs. Depth

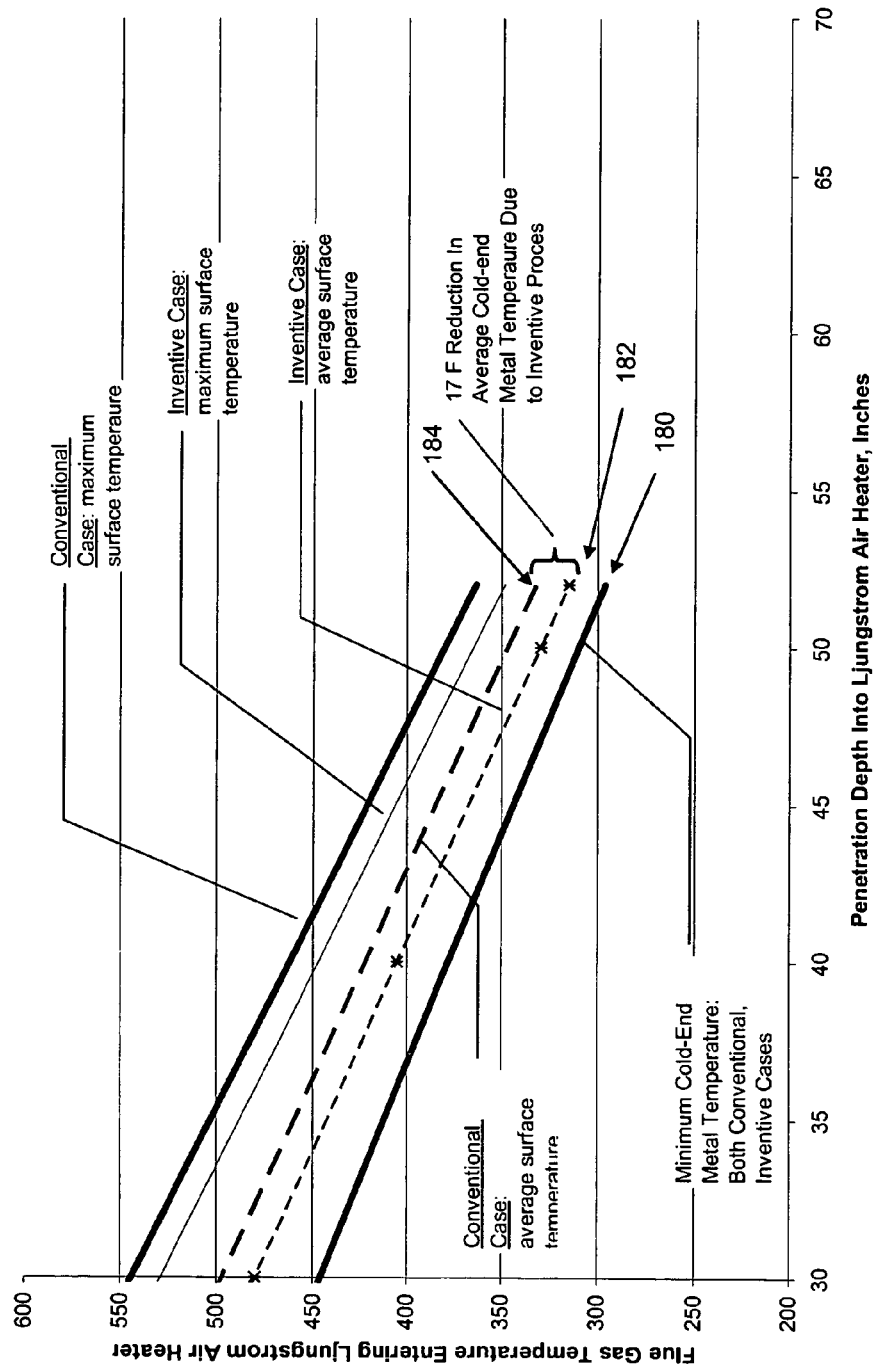
Figure 17: Air Heater Metal Temperature: Conventional vs. Inventive Process

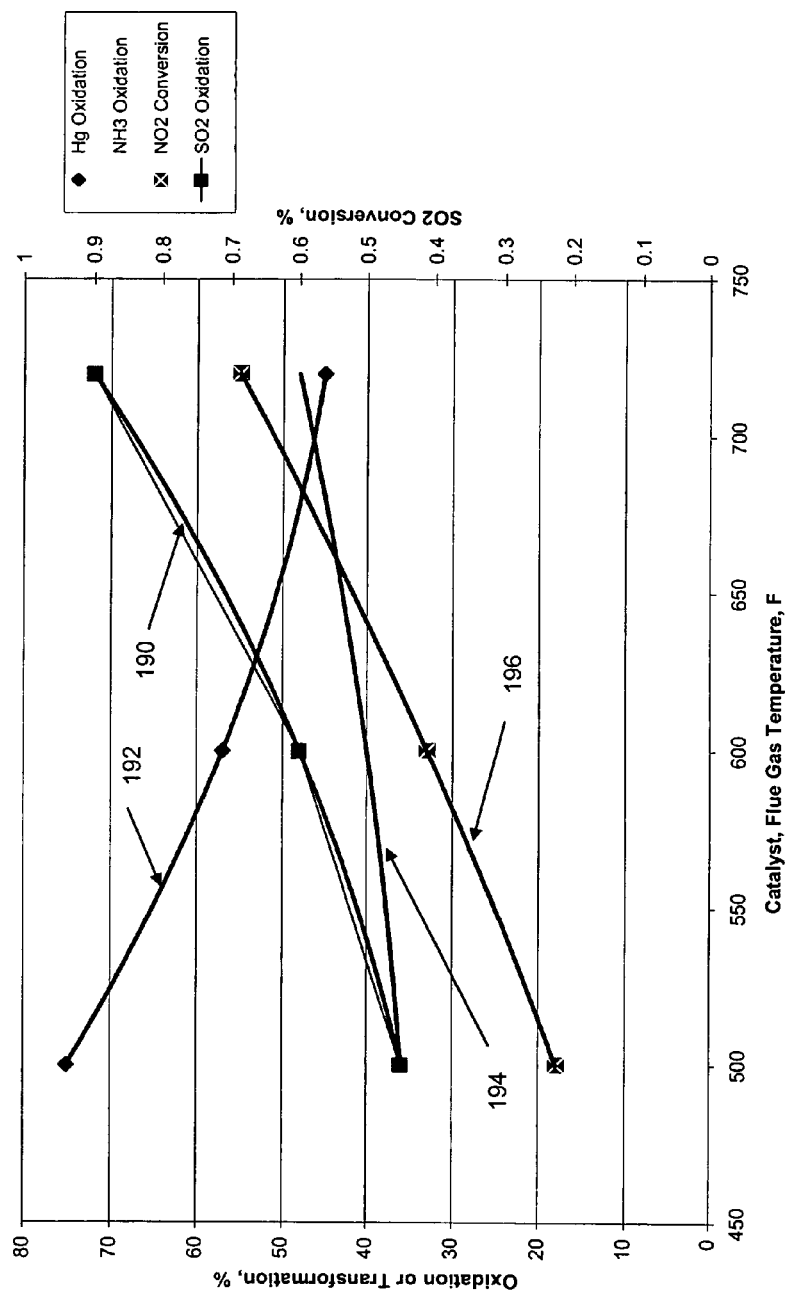
Figure 18: Characteristics Of Ideal Catalyst To Support Near-Zero NOx, Low SO2, And High Hg Capture

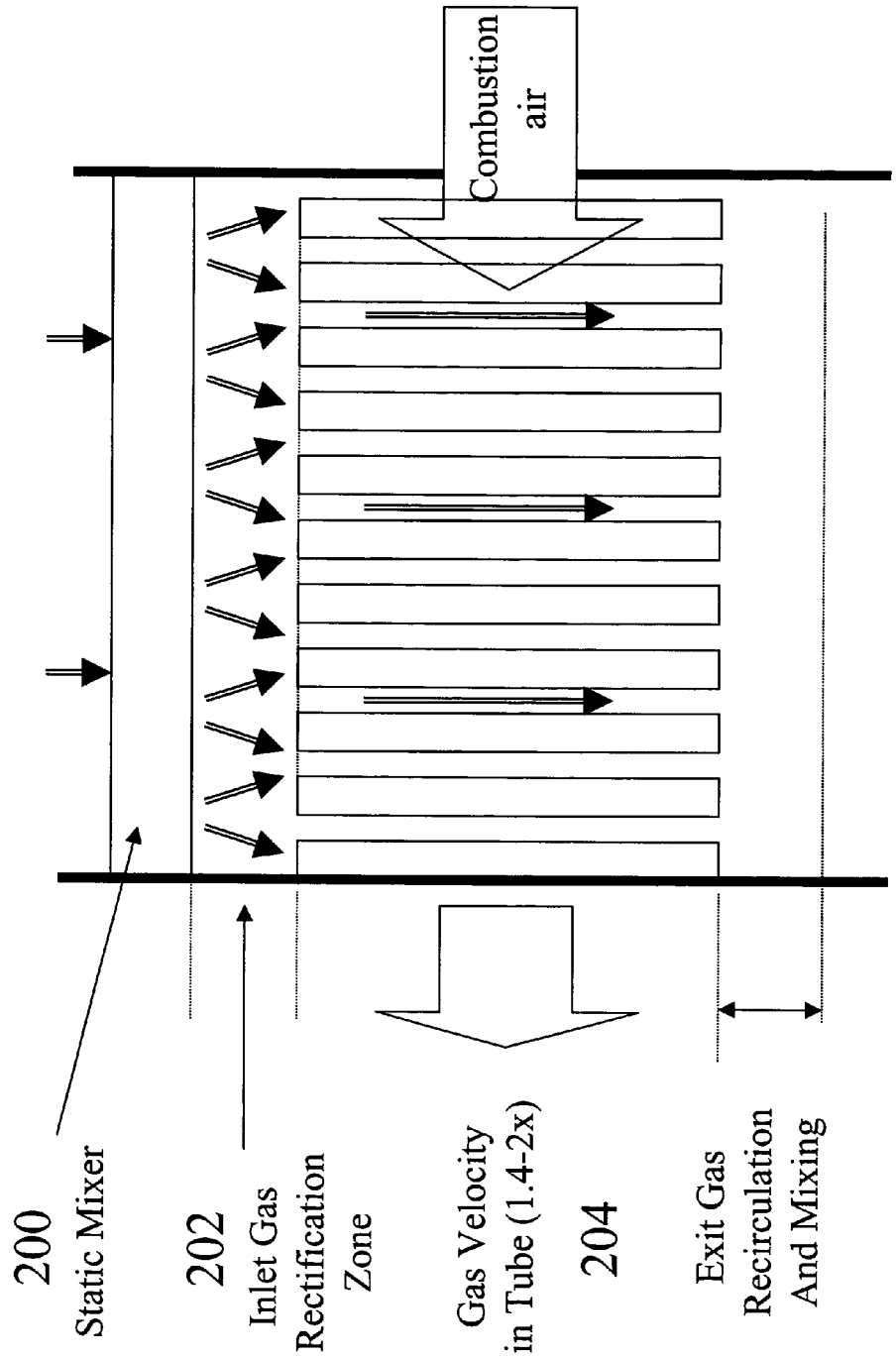
Figure 19: Arrangement of Static Mixer Preceding The Tube-Type Heat Exchanger

MULTI-STAGE HEAT ABSORBING REACTOR AND PROCESS FOR SCR OR NOX AND FOR OXIDATION OF ELEMENTAL MERCURY

This application is a Continuation-in-Part of International Application No. PCT/US2004/038222 filed Dec. 1, 2004 and of U.S. patent application Ser. No. 10/927,461 filed Aug. 27, 2004 now U.S. Pat. No. 7,438,876 and of U.S. patent application Ser. No. 10/725,057, filed Dec. 2, 2003 now U.S. Pat. No. 7,198,769. The disclosures of the prior applications are hereby incorporated by reference herein in their entireties.

FIELD OF THE INVENTION

The invention is related to the environmental control for removing nitrogen oxides (NOx) from combustion generated gases, and more particularly to a method and apparatus for improving the performance and reliability of selective catalytic reduction (SCR).

BACKGROUND OF THE INVENTION

A classic treatment on the removal of nitrogen oxides (NOx) from combustion generated gases using selective catalytic reduction (SCR) has been published by Bosch et. al. (1988), and more recently by Muzio et. al. (2002). Numerous patents have been awarded, with early work by Atsukawa (U.S. Pat. No. 4,302,431) typical of the initial status of the technology.

SCR is a relatively mature, well-developed environmental control technology for NOx emissions from fossil fuel fired power plants. The process has been extensively deployed internationally since the early 1970s, with approximately 180,000 MW of coal-fired boiler applications in the world at present. The first commercial SCR installations were deployed in Japan in the 1970s, initially on process heaters and refinery equipment, and subsequently on coal-fired power plants that fire by U.S. standards coal with low sulfur (0.5% or less) content. The mid-1980s witnessed the first commercial SCR applications in Europe, mostly confined to Germany, on coals typical of European usage. The origin of these coals from which European experience was generated was the Ruhr and Saar Valley in Germany, as well as Poland, South America, South Africa, Australia, and Venezuela. Most of these coals feature sulfur of 1-1.5% content. By the late 1980s, approximately 50,000 MW of SCR had been deployed on coal-fired units in Europe. In the U.S., approximately 100,000 MW of coal-fired capacity—over one third of the nation's coal-fired fleet—was operating by the end of the year 2004. The range of coals utilized are from extremely low sulfur western U.S. sources (e.g. Powder River Basin in Wyoming) to high sulfur sources such as Indiana, Pennsylvania, Ohio, Illinois and other midwestern U.S. sites.

The most problematic of these applications is for coal-fired power plants for the production of electricity, in particular those firing coals with sulfur content of 1.5% or higher. These applications are problematic due to the generation of two process byproducts. These are unreacted (residual) $NH_3$ and sulfur trioxide ($SO_3$), the former a consequence of incomplete reaction of $NH_3$ with NOx, and the latter oxidized by the catalyst from $SO_2$ in the flue gas. Both of these byproducts not only can comprise an environmental or nuisance hazard on their own, but can complicate the operation of balance-of-plant equipment. Most significantly, the oxidation of $SO_2$ to $SO_3$ has been problematic and responsible for the generation of visible plumes, receiving harsh public scrutiny (Akron Beacon Journal, 2001).

An innovative reactor design is described by Balling et. al. (U.S. Pat. No. 5,397,545) that uses a variable catalyst chemical composition to optimize the removal of NOx. Specifically, Balling et al. describe the concept of altering the composition of conventional SCR catalyst in the direction of flow, thus tailoring the chemical composition to the process conditions, to "accelerate" the reaction, in this case destruction of NOx. This art also introduces deploying a method of heat removal between layers, to arrest the escalation in temperature of the gas due to a reaction, with specific attention to the heat released by the exothermic reactions of CO oxidation. However, implementing this art recognizes only the potential to use a heat exchanger to correct for the complications introduced by upstream or preceding reactions. This art does not recognize the potential to use such a heat exchanger to establish a distinctly different process zone for a separate, downstream step that promotes optimal results of the entire process. The extraction of heat is particularly relevant in addressing design criteria for high sulfur coal which emphasizes the control of $SO_2$ oxidation over maximizing the rate at which NO is removed from flue gas, an observation not recognized or exploited by Balling.

In addition to NOx, mercury emissions from coal-fired power plants have received significant attention in recent years. Mercury is introduced into boiler flue gas as a trace element naturally occurring in coal. Mercury will exist in boiler flue gas in either the elemental or oxidized state, with the most prevalent oxidized form either mercuric oxide (HgO) or mercuric chloride ($HgCl_2$). The recent technical literature is replete with descriptions of investigations into control options for removing Hg from coal-fired utility flue gas (AWMA, 2001, 2003, and 2004).

Tests conducted by both the U.S. government and private utilities show that most of the Hg that exists in flue gas that is in a chemically oxidized state can be removed by conventional flue gas desulfurization (FGD) process equipment, installed for $SO_2$ control (Chu, 2003). The consequences of this fact are significant—that technology installed for $SO_2$ removal will also remove Hg—but only if the Hg is oxidized from the elemental form (Hge). Further, it is believed the FGD process chemistry can be manipulated in a manner to minimize the content of the sulfite ion in scrubbing liquid, in order to minimize the "re-emission" of captured Hg, and thus total Hg removal from the flue gas (Blythe, 2004).

The conventional deployment of an SCR process is relatively simple. FIG. 1 depicts the embodiment of an SCR process in a coal-fired power plant. Ammonia reagent ($NH_3$) is injected 18 into the flue gas stream 20 produced by a boiler 22, where the flue gas is at temperatures ranging from 550-800° F. The mixture of ammonia reagent and NOx in the flue gas reacts within a catalytic reactor 24 in the presence of one or more layers of catalyst 26 that are specially prepared to reduce the NOx to molecular nitrogen and water.

The amount of NOx removed is directly proportional to the quantity of ammonia reagent injected, indicated by the normalized ratio of the moles of $NH_3$ to the moles of NOx in the flue gas (the $NH_3$/NO ratio). Equally important to the effective operation of the SCR process is avoiding a deleterious impact on the performance of the Ljungstrom regenerative air heater 30. This standard device, an integral component of essentially all coal-fired power plants, extracts residual heat from the flue gas before discharge through the stack. The performance of this air heater can be detrimentally impacted through residual $NH_3$ and byproduct $SO_3$, as will be described subsequently.

Of the many factors that affect SCR performance, the most important is the mixing of reagent $NH_3$ with NOx in the flue gas. Several methods are pursued to maximize this mixing and achieve greatest SCR performance. FIG. 1 shows the location of devices installed in the ductwork, known as static mixers 28, leading into the reactor to improve the mixing of injected ammonia reagent with NOx, and assure that a relatively uniform distribution of flue gas velocity and composition reports to the reactor inlet. FIG. 1 depicts a popular location for the static mixers 28, which present a variety of surfaces of various geometrical shapes and orientation that impart mixing momentum to the flue gas.

FIG. 1 depicts the arrangement of catalyst within the reactor for the case of a three layer reactor design. For any given design, the total number of catalyst layers will vary with the type of fuel, desired NO removal, time between catalyst replacement, and other factors, and is usually between 2 and 5. Usually, all available layers that are provided in the catalytic reactor, such as depicted in FIG. 1, are not initially filled with catalyst. One layer is usually retained as a "spare" and filled with catalyst once the activity of the initial inventory begins to degrade, as a means to maximize the utilization of all catalyst.

For a given SCR process design and degree of $NH_3/NO$ mixing, the second most important practical limit to SCR performance is the volume and surface area of the catalyst within the reactor. This key design variable affects the residence time available for mass transfer and reaction. Even for good $NH_3/NO$ mixing and generous catalyst surface area, a small fraction of the injected reagent $NH_3$ eludes contact with NO and migration to an active site, and thus does not react to produce the desired products of molecular nitrogen and water. The unreacted ammonia reagent is thereafter referred to as residual $NH_3$. The NOx removal achievable with a given SCR design—be it 80%, 85%, or 90% or greater of inlet NOx values—is limited by the residual $NH_3$ that is introduced into the flue gas. Combined with the production of $SO_3$ from the catalyst, either or both of residual $NH_3$ and byproduct $SO_3$ can compromise the application of SCR.

In steam boilers for power generation, the SCR process is usually located as shown, between the boiler economizer section and the air heater. The temperature of flue gas at this location is well-suited for SCR application, as most boilers produce flue gas at a temperature between 500-800° F., adequate to provide the necessary catalyst activity for NOx removal. The maximum temperature at which the process can operate is determined by catalyst degradation, and a limit of 825° F. is usually observed.

The minimum flue gas temperature is determined by the flue gas sulfur trioxide ($SO_3$) content, due to the reaction of $SO_3$ with ammonia reagent in flue gas to form ammonium sulfates and ammonium bisulfates (ABS). These compounds can form at numerous locations following an SCR process, on surfaces downstream of the point of ammonia reagent injection, and as will be discussed throughout this disclosure, can be problematic for operation of both the SCR process and the power plant.

The potential to form ABS compounds on the catalyst and retard activity is of sufficient concern that boiler designers employ modifications to either the flue gas side or the steam side to insure that a minimum temperature is provided for, especially at lower loads where flue gas exiting the economizer is usually less than the values at full load. Recent contributions to the art of providing a minimum temperature for the SCR reactor at low load are taught by Cohen (U.S. Pat. No. 5,943,865), Ziegler (U.S. Pat. No. 5,775,266), and Wiechard (U.S. Pat. No. 5,555,849).

A summary of the flue gas temperatures for the onset of ABS deposits, as dependent on flue gas $SO_3$ and $NH_3$ content, is presented by "Ljungstrom Air Preheater Fouling Due To SCR Ammonia Slip" See attached reference for IDS, Counterman et. al. (1999) the subject matter of which is hereby incorporated by reference in its entirety. The highest temperatures noted (>500° F.) are those anticipated for a coal-fired power plant, due to the relatively high $SO_3$ content generated from the sulfur dioxide ($SO_2$) content by the boiler, and high NH3 concentrations corresponding to injected reagent. This temperature, defined by the relationship depicted on the third page of Counterman et al. (1999), establishes a minimum temperature "floor" for SCR operation, to prevent the deposition of ABS on the catalyst surface which will compromise NOx removal and damage the catalyst. The selection of minimum operating temperature must also recognize that condensation of ABS within the micropores of the catalyst must account for a different static pressure within the micropore, as induced by capillary action (Johnson, 2002, and Matsuda, 1982)

Process designers will modify the boiler to insure this minimum flue gas temperature is achieved at the reactor inlet, where the ABS deposition temperature is the highest that will be encountered. Subsequent to the first layer, the injected $NH_3$ will have reacted and thus decreased in concentration, reducing potential for ABS deposition until the significantly lower temperatures of the air heater are encountered.

Only recently has the ability of SCR catalyst to oxidize elemental mercury in flue gas been recognized (Chu, 2002, and Laudel, 2003). Although first noted in the technical literature 12 years ago (Gutberlet, 1992), the significance was not recognized until the Information Collection Request (ICR) issued by the U.S. EPA in 1998-1999 was conducted to establish baseline mercury emissions from coal-fired power plants. Data from this program is in the public domain (EPA, 2000), and has been evaluated to provide insight as to how mercury can be controlled.

A number of investigations have attempted to isolate and measure the role of the SCR catalyst in increasing the oxidation of Hg in flue gas (Chu, 2002, Richardson, 2002, Chen, 2002, and Senior, 2004. Data suggests the propensity for SCR catalyst to oxidize elemental Hg is not always significant and consistent, and that many factors other than the SCR catalyst may be responsible. Among these factors is flue gas temperature, as Downs and co-workers at McDermott Technology Inc. have reported that operation of the catalyst at lower temperature may promote the oxidation of Hg from the elemental to the oxidized state (Downs, undated). Further, at least one investigator of the fundamental mechanisms of mercury oxidation has cited that altering the cooling rate between the economizer and air heater inlet can favor both thermodynamic and gas phase considerations and enhance the formation of mercuric chloride (HgCl2), believed to be the principal fate of oxidized mercury. (Chen, 2002). These sources suggest that a lower reactor temperature, extended residence time, and additional cooling steps are preferred for mercury oxidation.

The oxidized form of mercury, once produced, can be removed in a conventional flue gas desulfurization (FGD) process. Field test data shows that a large fraction of the oxidized mercury that enters an FGD process is removed, and that FGD process equipment preceded by an SCR process removes more mercury (Chu, 2002, Chu, 2003, Winberg, 2004, and Blythe, 2004). The specific amount of oxidized Hg removed depends on the composition of coal, and the design and operation of the FGD process, specifically the details of the sulfur chemistry. It has been noted the amount of Hg capture can vary significantly, ranging from less than 50% to as high as 90%. Recent investigations suggest the net mercury removal is the result of oxidized Hg first becoming solubilized and removed, but offset by a fraction of the same oxidized Hg reduced within the FGD process liquor back to the elemental state. This newly-generated elemental mercury is then "re-emitted" (Blythe, 2004). The details of the Hg removal chemistry are not clear, but Blythe and coworkers speculate that sulfite within the FGD liquor catalyzes the reduction of oxidized Hg to elemental. Accordingly, minimizing FGD sulfite content in solution provides the best environment for Hg collection. Manipulating FGD process chemistry to minimize sulfite content may offer an improved environment to minimize Hg "re-emission", and improve net Hg capture.

In this regard, fundamental studies of FGD process chemistry conducted over 25 years ago suggests that $NO_2$ and NO both can play roles in the oxidation sulfite within the FGD process. Specifically, Rosenberg (1980) showed in laboratory-scale tests that NO—by inhibiting the oxidation of sulfite to sulfate—acts to maximize the amount of sulfite in FGD solution. Rosenberg and coworkers also noted that $NO_2$ acts to oxidize sulfite to sulfate, thereby minimizing the amount of sulfite in solution. This work was conducted to elucidate the role of NO and $NO_2$ on sulfite oxidation, and considered NO to $NO_2$ ratios that typify combustion products, specifically 12/1 to 19/1. Given the problem addressed at the time—controlling the oxidation of sulfite to minimize gypsum scaling—this work was used to conclude that FGD process chemistry benefited by a high ratio of NO to $NO_2$, to prevent oxidation of sulfite to sulfate.

Several key design and operating factors affect the performance and operation of SCR process equipment, for which a typical relationship is summarized in FIG. 2. These factors, which as will be shown can limit the usefulness of the SCR process, are favorably affected by the inventive process. These factors are the generation of residual $NH_3$ and byproduct $SO_3$, which can significantly interfere with plant operations, as chronicled in early commercial U.S. SCR applications on higher sulfur coal (Akron-Beacon Journal, 2001).

FIG. 2 presents the key NOx control performance data, depicting the NOx removed and residual $NH_3$ reagent introduced into the flue gas by the process. Specifically, FIG. 2 shows the typical approximate linear relationship between NOx removal (32, as indicated on the left y-axis) and $NH_3$/NO ratio, shown on the x axis 34. The value of NOx removal is shown as an approximate linear relationship (36), and the amount of residual $NH_3$ byproduct introduced into the flue gas on the right y axis (38).

Also shown in FIG. 2 are the residual $NH_3$ values generated in exchange for this NOx removal. The value of residual $NH_3$ will vary with remaining catalyst activity and thus lifetime, and is shown for three typical catalyst lifetimes: 10,000 hours 40, 16,000 hours 42, and 24,000 hours 44. The relationship depicted in FIG. 2 is for a hypothetical case of 200 ppm inlet NOx, but applies in principal to a wide range of process conditions.

FIG. 2 shows that almost any level of NOx removal can be attained—up to and approaching 95% of inlet values—depending on the level of unreacted $NH_3$ in flue gas that can be tolerated. The key to controlling the residual $NH_3$ is to maximize the mixing of injected reagent with flue gas, and the evolution of SCR technology is replete with attempts to maximize this mixing.

Most recently, a concept for a sophisticated injection system to insure balance between the injected reagent and combustion product gases has been applied for by Rogers et. al. (U.S. patent application 200330003029). As a further example of methods to improve this mixing, an injection grid has been described by Anderson et. al. (U.S. Pat. No. 5,988,115). An approach that is gaining widespread acceptance is the use of the static mixers that were shown in FIG. 1, which are important not only for stationery SCR applications as described by Henke (U.S. Pat. No. 4,737,345), but for mobile applications of SCR, as described by Hoffman et. al. (U.S. Pat. No. 6,553,755). Humsetal et. al. (U.S. Pat. No. 6,287,524) has devised methods to increase turbulence in the region of reagent injection to improve mixing. All of these approaches and others found in the literature teach improving mixing before entry into the reactor, but they do not address improving mixing once the flue gases have progressed beyond the first catalyst layer.

For most coal-fired boilers the concentration of unreacted $NH_3$ that can be tolerated is limited to just 2-3 ppm, due to impact on balance-of-plant equipment such as the Ljungstrom air heater and other operating equipment. Accordingly, although in concept $NH_3$/NO can be injected to achieve 95% NOx removal, practical limitations that restrict residual $NH_3$ to 2-3 ppm constrain NOx reduction to 85-93%. Significantly, FIG. 2 also shows that the residual NH3 generated depends on the catalyst lifetime, as residual $NH_3$ increases as catalyst lifetime increases from 10,000 hours 40, to 16,000 hours 42, to 22,000 hours 44.

The actual $NH_3$/NO ratio entering any catalyst layer is not a single value, but a distribution of values, each of which can significantly deviate from the average. SCR equipment is designed to meet a process specification, which defines among other factors the variance in flue gas concentration of $NH_3$/NO and other key process factors, such as NOx, flue gas temperature and the distribution of velocity at the inlet of the reactor. This variance is usually defined in terms of the standard deviation of a set of values from a mean.

For any given process specification, catalyst of sufficient volume and composition is provided to remove NO and control unreacted $NH_3$ reagent from flue gas, at a specified temperature. As an example, an SCR process specification may require a certain performance target from flue gas with an average velocity distribution of 15%, and $NH_3$/NO distribution of 6%, and temperature variance of 30° F.

In general, the most important of these SCR variables is the distribution of $NH_3$/NO. The significance of high standard deviation in $NH_3$/NO is that it creates local zones both less and greater than the $NH_3$/NO ratio required to react. Specifically, a portion of these local zones in the reactor will experience extremely low $NH_3$/NO ratio, well below the mean value, and other portions of the reactor will experience $NH_3$/NO ratio above the mean. Both contribute to compromised performance. The lower value $NH_3$/NO zones do not maximize the use of the catalyst, and the higher value $NH_3$/NO zones provide excess reagent over the quantity of NO injected. This $NH_3$ reagent in excess of the NO in the flue gas cannot react, and will generate residual $NH_3$ and thus limit the operation of the entire process.

The influence of changes in the standard deviation of $NH_3$/NO is shown in FIG. 3, showing the relationship between NOx removal achieved 50 and residual $NH_3$ 52, for the specified case of 200 ppm inlet NOx, and flue gas temperature of 700° F., inlet reactor $NH_3$/NO ratio of 0.91. The data in FIG. 3 shows that if 5% standard deviation of $NH_3$/NO can be achieved 54—reflecting good mixing and allowing operation at a NH3/NO ratio of 0.91—NO removal of about 90% can be achieved for a residual $NH_3$ limit of 2 ppm. However, if the standard deviation of $NH_3$/NO is only 10% 56—then NOx removal must be limited to about 86% (by lowering the $NH_3$/NO ratio to 0.85) to maintain a residual $NH_3$ limit of 2 ppm. FIG. 3 demonstrates why SCR process designers utilize static mixers and other means to minimize $NH_3/NO$ standard deviation in selecting process design.

FIGS. 2 and 3 depict process inlet and outlet data, but do not describe process conditions across each layer that limit SCR performance. A significant characteristic of the SCR process is the progression of NOx removal and consumption of $NH_3$ through the catalytic reactor. FIG. 4 presents data describing how key variables change across each layer of a three layer reactor, calculated for an example case similar to that of FIG. 3. FIG. 4 presents example calculations for an inlet NOx concentration of 200 ppm, operating at an $NH_3/NO$ ratio of 0.91, and achieving a 90% NOx removal. The key variables shown are NO removal, the $NH_3/NO$ ratio, and the standard deviation of $NH_3/NO$ ratio, at the inlet of a conventional design reactor. FIG. 4 also shows how these key variables change across each layer. FIG. 4 shows that 68% of the NOx is removed across the first layer, 19% across the second layer, and only 3% across the last layer. In fact, due to the relatively small amount of NOx removed across the last layer, its purpose as limited by conventional SCR design is as much to reduce unreacted $NH_3$ to negligible levels, as contribute to NO removal. Of note is that the $NH_3/NO$ ratio calculated for each of the three layers decreases through the reactor. The first layer is exposed to an $NH_3/NO$ ratio equivalent to the inlet of the process reactor—in this case 0.91.

However, the simultaneous consumption of ammonia and NOx lowers the $NH_3/NO$ ratio to 0.72 at the exit of the first layer, which corresponds to the inlet $NH_3/NO$ of the second layer. This same pattern continues, with $NH_3/NO$ leaving the second layer and thus entering the third layer as 0.31. Consequently, the last catalyst layer, although contributing equally to the capital and operating cost of the process as much as the first layer, contributes relatively little NOx removal.

Significantly, as the reaction progresses through each layer in the catalytic reactor, small deviations in $NH_3/NO$ in the first layer translate into large deviations in $NH_3/NO$ in subsequent layers. FIG. 4 shows the deviation in $NH_3$ that is observed at the reactor inlet, based on a 5% standard deviation at the reactor inlet. For these process conditions, the magnitude of the 5% unmixedness equates to about a 9 ppm excess or deficit of reagent at any point. This deviation from mean values is unchanged at 9 ppm as the reaction proceeds, but the fraction this 9 ppm of NH3 represents of remaining NO increases. Accordingly, for the example case, the standard deviation of the $NH_3/NO$ ratio entering the second and third layer increases, respectively, to 14 and 35%.

Thus, the practical NOx removal is limited by the ability to contact essentially all injected ammonia reagent with NOx, at an active catalyst site.

In general, most SCR catalysts oxidize from 0.5 to 3% of the $SO_2$ contained in the flue gas to $SO_3$. FIG. 4 included an estimate of the increase in $SO_3$ content across each layer for the example case. This extent of oxidation is dependent on the features of the catalyst, and the volume of catalyst applied.

Conventional practice allows for both catalyst and process design to minimize the conversion of $SO_2$ to $SO_3$. Some catalyst suppliers substitute for vanadium other active materials such as molybdenum that can provide NO removal (although less than compared to vanadium) but minimize $SO_2$ oxidation. In this way, $SO_2$ conversion can be reduced from 2% or greater to less than 1%. However, a larger catalyst volume to provide the same NO removal is usually required, to compensate for the lower activity with respect to NO removal.

The second method to control $SO_2$ conversion is lowering reactor operating temperature. FIG. 5 presents a typical relationship describing $SO_2$ oxidation rates for a commercial catalyst as a function of flue gas temperature. As shown, the rate of $SO_2$ conversion 60 is strongly dependent on flue gas temperature 62, with a reduction by 50° F. lowering the conversion rate by almost a factor of two 64 to 66. This relationship is exploited by process designers in minimizing $SO_2$ conversion for a particular application. Several commercial process designs have been noted where the boiler is modified so that the flue gas in the economizer exit section—where the SCR process is installed—is lowered by 50 to 75° F., thus mitigating $SO_2$ conversion.

The detailed physics of $SO_2$ to $SO_3$ oxidation suggests that, similar to the case of NO removal and ammonia reagent consumption, process conditions across each layer can vary significantly. Knowledge of this layer-by-layer variation can be exploited to provide a low $SO_2$ conversion reactor compared to conventional reactor design. Specifically, statistical thermodynamics dictates that all reactants in flue gas, such as NO, $NH_3$, $SO_2$, and $O_2$—compete with each other (as well as background species of $CO_2$, $H_2O$, etc.) for access to active catalyst sites. Accordingly, the depletion of NO and NH3 improves access of $SO_2$ to an active site, increasing $SO_2$ oxidation. This phenomena has been observed in the laboratory and at pilot scale—that $SO_2$ conversion is higher where the concentration of NO and $NH_3$ are relatively low. At laboratory scale, tests conducted by Svachula (1993) measured the influence on $SO_2$ oxidation of a large number of process variables. FIG. 6 shows the experimental relationship between $SO_2$ oxidation on the left-y axis 70 and $NH_3/NO$ ratio on the x-axis 72. Data in this figure shows that $SO_2$ oxidation, at low values of $NH_3/NO$ ratio such as 0.2 74, is about a factor of two greater than $SO_2$ oxidation when $NH_3/NO$ ratio is at typical operating levels of 0.80 76.

These experiments suggest that as flue gas passes through the reactor, each catalyst layer contributes an increasing conversion of $SO_2$ to $SO_3$ to the entire process. The last layer, where the concentration of $NH_3$ and NO is the lowest, contributes the most to the overall reactor oxidation of $SO_2$.

FIG. 4, in addition to summarizing NO and $NH_3$ concentration within a reactor, also reported the increase in $SO_3$ content across each layer, based on trends identified by Svachula. Specifically, FIG. 4 assumed the $SO_2$ oxidation is 0.3%, 0.5%, and 0.7% for the first, second, and third layer, respectively. The amount of $SO_3$ across each catalyst layer is shown, based on the amount created across each layer for a flue gas $SO_2$ content of 2,000 ppm, added to the inlet values produced by the boiler. Also shown is the temperature of deposition of ABS for each layer, as dependent on the $NH_3$ and $SO_3$ in the flue gas. This data shows that the ABS deposition temperature decreases with each layer. The highest ABS deposition temperature is for the first layer, and this establishes the minimum reactor operating temperature, for the conventional SCR design.

The generation of residual $NH_3$ and byproduct $SO_3$ from SCR can adversely impact operation of the entire power station.

Of note is that introduction of residual $NH_3$ by itself into the flue gas in quantities typical of SCR does not necessarily cause harm. There are possible environmental impacts, but these appear to be at concentrations well above those typical for flue gas at the SCR process exit. However, the secondary impacts on power plant and balance-of-plant equipment are of considerable concern. For residual $NH_3$ these are contamination of ash, and in conjunction with $SO_3$ air heater plugging from ammonium sulfates and bisulfates and materials corrosion.

Residual $NH_3$ will be absorbed onto the fly ash, and can compromise the sale of fly ash for construction supplement, or acceptable disposal. Early experience (1980-1985) in Japan suggested that limiting unreacted $NH_3$ in flue gas to 5 ppm minimized absorption of ammonia by fly ash and avoided these problems. However, this threshold—established for the types of coals fired in Japan—was not adequate for the conditions of application in Europe. German experience (1986 and after), consistent with early lessons from the first operating U.S. applications (1991 and on), showed that depending on the particular use for fly ash, the flue gas residual $NH_3$ should not exceed 2 ppm. This lower flue gas content maintained ammonia concentration in the ash generally below 100 ppm. Accordingly, the generally accepted design threshold for flue gas residual $NH_3$ was modified in the late-1980s to be 2-3 ppm. This design limit has been applied to the majority of U.S. installations, and maintaining residual $NH_3$ below this limit (along with avoiding air heater plugging, as discussed in the next section) establishes when either NO removal must be compromised, or catalyst added or exchanged.

The immediate and significant consequence of flue gas $SO_3$—as formed either inherently in coal-fired systems or augmented by the presence of SCR—is the production of ammonium sulfates and bisulfates from residual $NH_3$ and byproduct $SO_3$. As described previously, ammonium sulfates and bisulfates can form in the reactor, and specifically are most prone to form on the first layer where the injected $NH_3$ concentration is high. The flue gas temperatures where the deposition can occur have been previously described in FIG. 4. Once the injected $NH_3$ reacts and the concentration is reduced, ammonium sulfates and bisulfates are less likely to form at the temperatures typical of an SCR reactor (640-700 F), but could form as the flue gas cools to 400-500 F as it passes through the Ljungstrom heat exchanger.

FIG. 7 represents a conventional Ljungstrom air heater for use in power boilers. The purpose of this device is to recover the last amount of usable heat prior to entry of the flue gas to the environmental control system. Flue gas enters a heat exchanger shell 80, that is split in two sections, segregating flue gas exiting the boiler from combustion air entering the boiler. The gases pass through three stages of heat exchange elements that are aligned in the direction of flow. These heat exchange elements are assembled as "baskets" that can be easily removed and replaced, and are essentially a series of plates spaced to allow flue gas flow with minimal pressure drop but the necessary heat transfer characteristics. The three stages of the heat transfer baskets are: the "hot" 82, "intermediate" 84, and "cold" 86 sections. These baskets rotate at approximately 1 rpm between the flue gas and combustion air sections. Hot flue gases from the boiler give up heat to the baskets, which retain this heat and rotate into the combustion air, subsequently increasing the temperature of the combustion air on the way to the boiler.

Essentially all commercial boilers for power generation utilize such a device, and in excess of 90% employ the Ljungstrom-type design. The major design variant is whether the axis of rotation of the heat exchange material is horizontally or vertically configured. The device usually lowers the flue gas temperature from approximately 575-725° F. (the specific value depending on boiler design and coal composition) to 350-275° F., transferring the heat to the incoming combustion air, and improving the combustion process. To maintain reliable and effective performance, the heat exchange materials or "baskets" should remain clean and unobstructed, otherwise the flue gas pressure resistance will increase beyond the design capability, restricting the maximum flue gas flow rate and thus boiler power output.

FIG. 8 shows in more detail the three elements of the heat transfer surfaces: the "hot", "intermediate", and "cold" sections. These surfaces are generally kept clean through the use of "sootblowing", in which a high pressure (100 psig) pulse of cleaning media (usually steam from the boiler) is injected across the face of the surfaces. The sootblowing lances can be located at either the hot-end 96 and thus inject cleaning media in the direction of flue gas flow, or the cold-end 98 and thus inject cleaning media against the direction of flue gas flow. The steam or other cleaning media is injected via nozzles that are swept across the inlet of the baskets, covering the entire cross-section in 1-3 minutes. The frequency with which this cleaning process is repeated varies widely, from several times per day to once per month, depending on the type of coal fired, and boiler design.

Each of these heat exchange sectors is characterized by a different flue gas temperature range. The hot section generally lowers the flue gas from the reactor inlet values of 575-725 to 500-575° F. At these relatively high temperatures there is little opportunity for formation of ABS compounds, and subsequent deposition on heat exchange surfaces. Accordingly, the materials chosen for fabrication of the hot-end baskets 90 can be lower cost conventional steels, and the spacing of plates can be minimized, to maximize heat transfer without concern for plugging. The intermediate baskets 92 lower flue gas temperature from 500-575 to 400-450° F. In this section, the opportunity for deposition and plugging induced by lower temperatures improves, thus materials for some applications should be constructed of corrosion-resistant alloys. Also, the spacing between plates may be required to be increased, to minimize the opportunity for plugging passageways. The cold-end baskets 94, as the last element, lowers flue gas from 400-450 F to the exit of 275-350 F, depending on the fuel and design of the boiler. It is this cold end section that experiences the most aggressive conditions with respect to plugging by deposition of ABS, as well as $SO_3$ deposition to form condensed sulfuric acid. It should be noted the cited temperature ranges are approximate, and individual applications can vary depending on boiler performance and coal composition.

An additional operating characteristic of the Ljungstrom-type air heater is the cyclic temperature variation that the heat exchange materials or baskets experience. This distribution in temperature is important as it determines the condensation of flue gas $SO_3$ into sulfuric acid. Specifically, FIG. 16 illustrates the calculated surface temperature of the heat exchange baskets, as a function of the depth within the air heater. In FIG. 16, the zero depth corresponds to the inlet or hot side of the air heater, and increasing depth as measured in inches represents the flow direction toward the cold-end or exit of the air heater, which is at 52 inches for the example case cited. FIG. 16 illustrates that the surface temperature of the heat exchange materials varies between and a minimum and maximum. This temperature variation is due to the cyclic movement of the heat exchange baskets from the relatively higher temperature flue gas (to be cooled) into lower temperature combustion air (to absorb heat). As shown in FIG. 16, at any given distance into the air heater, a maximum surface temperature 170 is observed as the basket emerges from the relatively high temperature flue gas into the cooler combustion air, and this surface eventually gives up heat to the cooler combustion air, and experiences a minimum temperature 174, prior to re-entering the flue gas. FIG. 16 also reports an average surface or metal temperature 172, determined from the maximum and minimum surface or metal temperatures shown. FIG. 16 shows the minimum cold-end metal temperature is lower than the average cold-end metal temperature, by anywhere from 72° F. at the air heater inlet (at zero inches depth) to 32° F. at the air heater outlet (at 52 inches depth). The power plant designer is concerned with both the minimum and the average metal temperatures, at the maximum depth into the air heater, corresponding the exit plane, known as the cold-end. In fact, the power plant designer, in seeking to maximize power plant thermal efficiency, specifies a cold-end average metal temperature that is the lowest possible without incurring unacceptable $SO_3$-derived corrosion. Design decisions must address not only the cold-end average metal temperature but also the minimum metal temperature, as the latter provides the best opportunity for condensation of sulfuric acid, the prime actor for corrosion. Accordingly, a method to enable a Ljungstrom-type air heater to extract the same or more heat from flue gas while minimizing the variance in minimum cold-end metal temperature from the average cold-end metal temperature would represent an improvement to the state of art of air heater design. Designers could exploit this in either of two ways: the first by retaining the same average cold-end metal temperature with a less extreme minimum temperature, thereby reducing $SO_3$-derived corrosion; the second by retaining the same minimum cold-end metal temperature, but exploiting a lower average metal temperature thereby increasing thermal efficiency. Consequently, in the first case, $SO_3$-derived corrosion would be reduced for the same boiler thermal efficiency; in the second case the boiler thermal efficiency would be increased for the same level of $SO_3$-derived corrosion.

Research during the early period of SCR evolution showed that residual $NH_3$ from SCR will combine with $SO_3$ in the flue gas to form ammonium sulfates and bisulfates at the interface of the intermediate and cold-end sections, as depicted in FIG. 8. The occurrence of these deposits at this interface appears to be a consequence of both the temperature and physical conditions of ammonium sulfates and bisulfates formation, and the effectiveness of the cleansing from sootblowing activities. Specifically, it is believed that deposits occur at the interface of the intermediate and cold ends sections because the "void" 95 between the two sections allows the high energy cleansing jet of steam or other cleaning media to expand, diffusing the cleaning momentum into the void, thus compromising the ability to maintain the surfaces clean. A solution tried with some success is integrating the intermediate and cold sections into a single combined intermediate/cold section (Bondurant, 1999). The advantage of the combined cold/intermediate section is that eliminating the void between the intermediate and cold-end sections prevents the soot blower medium from diffusing and compromising cleaning momentum. The details of this mechanism have never been proven, but experience with one piece, intermediate/cold-end baskets on SCR-equipped units demonstrates these surfaces can help minimize, but not completely eliminate, accumulation of ammonium sulfates and bisulfates.

The reason why air heater deposition problems are not completely eliminated but persist with units equipped with a one piece intermediate/cold-end section is that the sootblowing media must still traverse the void between the hot-end and the one piece intermediate/cold sections. This remaining void can still dissipate the sootblowing media momentum, compromising cleaning ability. Ideally, a one piece heat exchange element combining the hot, intermediate, and cold-end sections could minimize or even eliminate the dissipation of sootblowing momentum. However, manufacturing limitations prevent such a one piece element from being constructed, at least for a cost that is competitive with the present approach. A number of technical and cost barriers prevent configuring all three sections (hot/intermediate/cold) into a one piece element. Recent contributions to the art of air heater design by Fierle et. al. (U.S. Pat. No. 6,260,606) are typical of attempts to mitigate the accumulation of ABS in the cold end section, as are the techniques described by Bondurant (1999).

As noted previously, the Ljungstrom-type air heater is the predominant design type of air heater used in power boiler applications, and the background information presented to date has rightly focused on this most popular concept. Other types of air heater designs are used, among them the Rothemuhle design, which is popular particularly in applications outside the U.S. The Rothemuhle design differs from the Ljungstrom concept in that the heat absorber plates, rather than rotating, are stationary. It is the rotational action of a flue hood that diverts flue gas from the combustion products and the air entering the boiler into different sections for heat exchange. The challenges imposed by SCR on air heater operation for the Rothemuhle design are conceptually the same as the Ljungstrom design, although the details are different.

SUMMARY OF THE INVENTION

In some embodiments, this invention is directed to a selective catalytic reduction apparatus, comprising at least first and last catalyst layers in series for reducing nitrogen oxides in a flue gas; at least one interstage heat exchanger located after the first layer and before the last layer, that lowers flue gas temperature, and that acts as a mixing body to lower the standard deviation of the $NH_3/NO$ ratio entering catalyst layers after the first catalyst layer, thus providing better consumption of both ammonia and NOx in the reactor than would be achieved in the absence of the at least one interstage heat exchanger.

In some embodiments, this invention includes, in addition to said first and last catalyst layers, a second catalyst layer, wherein the at least one interstage heat exchanger is located between the second and third catalyst layers.

In some embodiments, this invention includes, in addition to said first and last catalyst layers, a second catalyst layer and a third catalyst layer, wherein the at least one interstage heat exchanger is located between the first and second, second and third, or third and last catalyst layers.

In some embodiments, this invention includes, in addition to said first and last catalyst layers, a second catalyst layer, a third catalyst layer and a fourth catalyst layer, wherein the at least one interstage heat exchanger is located between the first and second, second and third, or third and fourth, or fourth and last catalyst layers In some embodiments of this invention, the catalyst composition is not altered to accelerate or decelerate any reactions.

In some embodiments of this invention, preferably 25-125° F. of temperature, and more preferably 125-275 F of temperature are transferred out of the flue gas by the heat exchanger located between catalyst layers.

In some embodiments, this invention includes a compressed depth Ljungstrom air heater, or alternatively a Rothemuhle design air heater, with a semi-continuous two piece air heater basket, or a continuous one piece air heater basket.

In some embodiments of this invention, the apparatus is configured to utilize a $NH_3/NO$ ratio approaching unity.

In some embodiments, this invention includes at least one additional mixing device located between at least two catalyst layers to further mix reagent and NO.

In some embodiments of this invention, the additional mixing device is a static mixing device, located either alone or preceding an interstage heat exchanger, In some embodiments of this invention the static mixing device is a perforated plate or plates, designed to operate within a flue gas flow stream with a velocity of 10-20 aft/s, providing improved conditions to resist erosion by fly ash, compared to the higher flue gas flow conditions of 30 aft/s or more that typify the ductwork preceding the SCR reactor In some embodiments, this invention includes an additional layer containing a special-purpose catalyst for oxidation of mercury, of a composition such that the lower temperature decreases the SO2 conversion significantly, but only marginally decreases or does not affect the mercury oxidation, or perhaps increases mercury oxidation, said special-purpose catalyst not being a proportional change in concentration of the ingredients of a conventional SCR catalyst, said special-purpose catalyst having a formulation preferential to Hg oxidation. For example, the lower second stage operating temperature may allow catalysts comprised of at least one active species selected from the group consisting of Pt, Pd, Ru, Rh, Rd, Ir, V, W, Mo, Ni, Co, Fe, Cr, Cu and Mn to be supported by at least one carrier selected from the group consisting of $TiO_2$, $SiO_2$, $ZrO_2$, $Al_2O_3$ and $WO_3$ and/or zeolite. This special-purpose catalyst can comprise oxidation catalysts designed for CO and HC, utilizing ceria, optionally doped with platinum or palladium, in carriers comprised of titania, zirconia, titania-zirconia, silica, and certain types of alumina that are tolerant to sulfur poisoning. This catalyst may also oxidize a portion of the remaining NO that eludes capture to $NO_2$, increasing the ratio of $NO_2$ to NO entering an FGD system.

In some embodiments of this invention, the additional layer of special-purpose catalyst comprises carbon, material formed from fly ash, and/or at least one palladium-based compound.

In some embodiments, this invention includes a second special-purpose additional layer of catalyst to oxidize residual $NH_3$ to NO, or to transform residual $NH_3$ to molecular nitrogen ($N_2$), thus minimizing the impacts of residual $NH_3$ on the balance-of-plant equipment.

In some embodiments of this invention, the special purpose catalyst layer for NH3 oxidation consists of a metal promoter (e.g. Cu, Fe) within zeolite, Also, ceria, platinum, and palladium may also be included in these catalytic materials.

In some embodiments, the same catalyst material is used for both oxidation of mercury and residual $NH_3$, and is comprised of material that is not a proportional change in composition of the ingredients of conventional SCR catalyst. An example of this catalyst would be the use of Cu in zeolite, which is specified by Speronello (U.S. Pat. No. 5,516,497) for $NH_3$ oxidation, and by Shintaro (App 20030170159) for Hg oxidation. Also, as described by Voss (U.S. Pat. No. 5,491,120), the use of ceria (Ce) in one or more of titania, zirconia, ceria-zirconia, silica, alumina-silica, and alpha-alumina is contemplated as providing favorable oxidation of both $NH_3$ and Hg. This catalyst may also oxidize NO to $NO_2$.

In some embodiments, this invention includes a combustion air bypass duct controlled by a modulating damper to direct combustion air leaving a compressed, one stage air heater directly to a boiler thus bypassing the interstage heater after the first catalyst layer, while retaining a minimum amount of air in the interstage heater exchanger to avoid overheating of tubes, to preserve the gas temperature in the first catalyst layer above a minimum required to avoid ABS deposition, for use at lower loads or at a full load.

In some embodiments, this invention is directed to a method for the selective catalytic reduction of nitrogen oxides, comprising: introducing a reducing agent into a flue gas containing nitrogen oxides; then passing the flue gas through at least a first layer of nitrogen oxide reducing catalyst where an amount of nitrogen oxides in said flue gas is reduced; then passing the flue gas through a heat exchanger that removes heat from the flue gas and also mixes the flue gas and the reducing agent; and then passing the flue gas through at least one additional layer of nitrogen oxide reducing catalyst where an additional amount of nitrogen oxides in the flue gas is reduced.

In some embodiments of this invention, the at least one heat exchanger is at least one interstage heat exchanger, that lowers flue gas temperature, and that acts as a mixing body to lower the standard deviation of the $NH_3$/NO ratio entering catalyst layers after the first catalyst layer, thus providing a higher amount of consumption of both ammonia and NOx in a reactor than would be achieved in the absence of the at least one interstage heat exchanger. This heat exchanger can be used for either combustion air preheat, reducing the size of the Ljungstrom air heater, or boiler feed water or steam heating.

In some embodiments of this invention, the at least one interstage heat exchanger transfers preferably 25-125° F. of temperature, and more preferably 125-275 F of temperature; and comprises utilizing a one-piece heat exchange element in a Ljungstrom-type heat exchanger, or alternatively a Rothemuhle-type heat exchanger, the purpose of the one-piece heat exchanger to enable cleaning of ammonium sulfates and ammonium bisulfates from air heater surfaces with soot blowers located at both the inlet and outlet of the air heater.

In some embodiments of this invention, the reducing medium is ammonia and the $NH_3$/NO ratio is between 0.90 and 0.98.

In some embodiments of this invention, the $NH_3$/NO ratio is about 1:1.

In some embodiments of this invention, particularly those that contain the additional special-purpose catalyst layer for oxidation or transformation of residual $NH_3$ (either singly or in concert with oxidation of mercury), the $NH_3$/NO ratio can slightly exceed stoichiometric proportions, such as up to 1.05.

In some embodiments, this invention includes, before passing the flue gas through the at least one additional catalyst layer, passing the flue gas through a separate static mixing device to mix reducing agent and NO, further mixing the partially reacted $NH_3$ and NO.

In some embodiments, this invention includes passing the flue gas through at least one additional layer of a special-purpose catalyst for oxidation or transformation of mercury, said special-purpose catalyst not representing a proportional change in concentration of the ingredients of a conventional SCR catalyst, said special-purpose catalyst having a formulation preferential for Hg oxidation.

In some embodiments, this invention includes passing flue gas through at least one additional layer of special-purpose catalyst for oxidation or transformation of residual $NH_3$, said special-purpose catalyst not representing a proportional change in concentration of ingredients of conventional SCR catalyst, and possibly the same catalyst as used for oxidation of mercury, In some embodiments, this invention includes passing a portion of the flue gas through a combustion air bypass duct controlled by a modulating damper to direct combustion air leaving a compressed, one stage air heater directly to a boiler thus bypassing the interstage heater after the first catalyst layer, while retaining a minimum amount of air in the interstage heater exchanger avoiding overheating of tubes, preserving gas temperature in the first catalyst layer above a minimum required to avoid ABS deposition.

In some embodiments of this invention, the operation of the downstream catalyst layers at lower flue gas temperature by a magnitude of preferably 25° F. to 125° F., and more preferably 125° to 275° F., which lowers the oxidation of $SO_2$ across each layer by a factor of preferably 25-50%, or more preferably 50-85%, and/or increases the oxidation of mercury across each layer by a value of preferably 20 to 100%, and more preferably from 100-250%, both compared to the rate that would normally be observed without the reduced flue gas temperature.

In some embodiments, this invention is directed to a selective catalytic reduction apparatus, comprising at least first and last catalyst layers in series for reducing nitrogen oxides in a flue gas; at least one interstage tube heat exchanger located after the first layer and before the last layer, that lowers flue gas temperature, and that acts as a mixing body to lower the standard deviation of the $NH_3/NO$ ratio entering catalyst layers after the first catalyst layer, thus providing better consumption of both ammonia and NOx in the reactor than would be achieved in the absence of the at least one interstage tube heat exchanger.

In some embodiments, this invention is directed to a selective catalytic reduction apparatus, comprising at least first and last catalyst layers for reducing nitrogen oxides in a flue gas; at least one interstage static mixer located after the first layer and before the last layer, that acts as a mixing body to lower the standard deviation of the $NH_3/NO$ ratio entering catalyst layers after the first or subsequent catalyst layers, thus providing better consumption of both ammonia and NOx in the reactor than would be achieved in the absence of the at least one interstage static mixer.

In some embodiments of this invention, the inter-stage heat exchanger is directed to preheating of boiler feedwater or steam, to improve boiler thermal efficiency, and thus lower plant heat rate.

In some embodiments of this invention, the interstage heat exchanger reduces the temperature of the flue gas entering the Ljungstrom-type heat exchanger by preferably 25 to 125° F., or more preferably 125° to 275° F., necessitating a change in the design of the Ljungstrom-type heat exchanger so that the deviation at the cold-end of the minimum metal temperature from the average metal temperature is reduced from approximately 25-40° F., to 8-22° F., and as a consequence the average cold-end metal temperature can be by lowered by 5 to 20° F., improving plant efficiency, for the same minimum cold-end metal temperature and potential for corrosion.

Accordingly, the potential to use SCR as a proactive method to assist mercury control by promoting removal in FGD equipment is a new and still evolving concept. The applicant is not aware of a discussion, prior to this disclosure, of a proactive effort to design an SCR process specifically to promote mercury removal. Shintaro (Application 20030170159) describes catalytically promoting the oxidation of Hg, but utilizes a separate reactor dedicated for this purpose, located following the air heater, and requiring gas reheat, significantly increasing the capital and operating cost of the process.

Another consideration in the design of an SCR process is the possibility to devote one of the catalyst layers to the destruction of residual ammonia ($NH_3$), by oxidation to NO, or perhaps transformation to molecular $N_2$, through a series of intermediate steps. Converting the reagent-derived residual ammonia to NO could be counterproductive to NO control, as the unreacted $NH_3$ will transform to NO on a one-to-one molecular basis, compromising NO removal performance. However, depending on the relative exchange between these species, the benefits may be significant, as will be subsequently described. The potential to utilize such a "two-stage" SCR process that first reduces NOx and second destroys residual $NH_3$ by oxidation has been described by Speronello (U.S. Pat. No. 5,516,497) utilizing, among others, a zeolite-based catalyst. However, this art does not recognize purposely operating each stage at a different temperature, as a proactive means to derive optimal performance of each of the two stages, with the result benefiting the entire process step. Further, this art does not recognize the second stage oxidation catalyst, as described by Speronello, featuring a higher content of active ingredients (such as copper, platinum, or palladium, for example), will introduce complicating consequences. Specifically, most oxidation catalysts are not completely selective, and will oxidize other species; of most concern is $SO_2$ to undesirable $SO_3$. Hastings (2003) describes a similar process for destroying residual $NH_3$ in $SO_2$-free natural gas-fired combustion turbine applications, where the high $SO_2$ oxidation tendencies of such as catalyst are irrelevant (see also U.S. Pat. No. 6,080,376), This limitation is believed to be one reason why the "two-stage" reactor process as described by Speronello and Hastings has not been commercially applied to SCR for steam generators for sulfur-containing fuels.

The use of a catalyst layer dedicated to the destruction of residual $NH_3$ by lowering the quantity of residual $NH_3$ in flue gas could improve NOx removal performance.

In some embodiments of this invention, the use of the interlayer heat exchanger to improve $NH_3/NO$ mixing, operate at an $NH_3/NO$ ratio of near unity, employ a special-purpose catalyst to oxidize or transform $NH_3$ to molecular $N_2$, and also to oxidize a portion of the remaining NO to $NO_2$ so that the ratio of $NO_2$ to NO increases beyond the conventionally observed ratios of 12/1 to 20/1, will provide near-zero NOx emissions, low $SO_3$, and high (95% and greater) mercury capture. The consequence of Rosenberg's work is that almost eliminating the content of NO entering an FGD process, and increasing ratio of $NO_2$ to NO to preferably 1 to 10, more preferably 1 to 5, and most preferably 1 to 1 or higher is desired to minimize FGD sulfite content and thus maximize Hg removal, preferably to 95% and greater.

The concept of utilizing the interstage heat exchanger to preheat combustion air, and thus compress the air heater, although advantageous as previously described, is not essential to the success of the concept. Specifically, depending on the application, particularly the retrofit of the SCR reactor to an existing power plant, it may not be feasible to modify the combustion air ductwork and handling equipment to accommodate preheating of combustion air by the inter-stage air heater. In this case, the benefits of the multi-stage reactor can be derived by utilizing the interstage heat exchanger for a purpose other than the preheating of combustion air. Specifically, utilizing the interstage heat exchanger to preheat boiler feedwater is one logical application. The retrofit of supplementary heat exchangers to increase the temperature of boiler feedwater is a well-known method of increasing boiler efficiency, and improving plant heat rate (EPRI, 1985). Such heat exchangers can be configured in an array of layouts and sizes, and located between the catalyst layers of a SCR reactor.

BRIEF DESCRIPTION OF THE DRAWINGS

FIG. 1 is a sectional side view of the application of conventional SCR to a coal-fired boiler, showing the flue gas path from the furnace through the air heater FIG. 2 presents the fundamental SCR performance relationship between the injected ammonium reagent, and the NOx removal derived (on the left axis) and the residual $NH_3$ produced (on the right axis).

FIG. 3 presents the relationship between NOx reduction and residual $NH_3$ produced, for a given SCR process, for a fixed set of design conditions, as a function of the maldistribution of flue gas velocity entering the reactor, as measured by the standard deviation of the variation.

FIG. 4 shows the SCR process conditions across a three layer catalyst reactor, for a conventional design reactor, depicting the change in process conditions across each layer, and how the NOx removal performance and control of $SO_2$ oxidation compromise across each layer.

FIG. 5 depicts the relationship between $SO_2$ oxidation by the SCR catalyst, and the flue gas temperature.

FIG. 6 describes the fundamental relationship between $SO_2$ oxidation and $NH_3/NO$ ratio at the catalyst surface, based on bench-scale data.

FIG. 7 presents a sectional cross section of a Ljungstrom-type air heater, showing both the flue gas and combustion air sides, and the three sections of heat exchange material.

FIG. 8 provides additional detail for the heat exchange surfaces contained within the Ljungstrom-type air heater, showing the location of soot blowers for cleaning the surfaces, and the usual zone of deposition of ammonium sulfates and bisulfates.

FIG. 9 is a sectional side view of the application of the inventive process to a coal-fired boiler, showing the flue gas path from the furnace, through the first reactor layer, the interstage heat exchanger and mixing surfaces, the final reactor layers, and the compressed Ljungstrom-type air heater.

FIG. 10 is a section of the interstage heat exchanger, showing the path of flue gas and combustion air flow, and the zones of flue gas recirculation both entering and exiting the heat exchange, which serves to induce additional mixing.

FIG. 11 compares for the inventive process the fundamental performance relationship between the injected ammonium reagent, and the NOx removal derived (on the left axis), and for both the conventional and inventive concepts the residual $NH_3$ produced (on the right axis), and how the lower residual ammonia from the inventive process allows operation at a higher $NH_3/NO$ ratio.

FIG. 12 shows the SCR process conditions across a three layer catalyst reactor, comparing both the conventional and inventive design reactor, depicting the change in process conditions across each layer, and how the NOx removal performance and control of $SO_2$ oxidation change across each layer.

FIG. 13 shows the relationship between the oxidation of elemental mercury and sulfur dioxide in a coal-fired boiler flue gas, as a function of flue gas temperature, for any number of commercial or developmental catalysts, showing how a modest reduction in flue gas temperature lowers $SO_2$ oxidation but not mercury oxidation.

FIG. 14 depicts the cross-section of the multi-stage SCR reactor containing an inter-stage heat exchanger for heating boiler feedwater or steam, following the first catalyst layer.

FIG. 15 shows spacing in the reactor of FIG. 14 that diverts the streamlines of flue gas from a straight transit, intended to induce mixing, but not so much as to induce a significant flue gas pressure drop, or allow for accumulation of fly ash between the tubes.

FIG. 16 illustrates an exemplary variation in temperature of the metal elements of the Ljungstrom-type heat exchanger, as a function of depth into the air heater.

FIG. 17 shows a comparison of an exemplary variation in temperature of the metal elements of the Ljungstrom-type air heater at the cold-end plane, for both a conventional design, and a design as a result of adopting an innovative process in accordance with embodiments of this invention.

FIG. 18 depicts an example of the ideal performance characteristics of a special-purpose catalyst, to enable near-zero NOx emissions, negligible $SO_2$ conversion, maximum Hg oxidation, and elevated $NO_2$ to NO to insure maximum mercury capture.

FIG. 19 shows the arrangement of a static mixer located prior to the interlayer heat exchanger, to exploit the actions of a heat exchanger with flue gas flowing internal to heat exchange tubes, to ensure parallel flue gas flow at the entrance to the subsequent catalyst layer.

DETAILED DESCRIPTION OF THE INVENTION

The innovation to this concept that is the subject of this disclosure provides benefits beyond the conventional approach described in these references in three ways. First, the removal of nitrogen oxides (NOx) increases. Second, the production of secondary and byproduct species is reduced, improving the reliability and applicability of the process. Third, the innovation promotes the control of mercury (Hg) emissions from coal-fired power plants, without an accompanying deleterious impact that compromises broad use of this technology. Fourth, the innovation allows for an increase in the thermal efficiency of the boiler, at substantially the same sulfuric acid-based corrosion rate.

SCR technology could benefit from an improvement, as described in this disclosure, to simultaneously reduce one or both of the undesirable process byproducts, and improve the tolerance of balance-of-plant equipment to these byproducts. The ability to oxidize mercury from the elemental state to the oxidized state without producing undesirable byproducts such as $SO_3$ is a further feature of the inventive process. The conventional application of SCR—operating at process temperatures of 600-780° F. and using standard catalysts—is known to prompt this oxidation of elemental mercury to the oxidized state (Laudal, 2003), but at least laboratory test at well-controlled conditions suggested the catalysts that best oxidize mercury can also be expected to simultaneously increase the oxidation of $SO_2$ to $SO_3$ (Bock, 2003). Specific reaction steps in the sulfur-related transformation of elemental to oxidized Hg have been speculated by Chu (2004). As a consequence, any attempt to apply conventional SCR technology to further the oxidation of mercury will be accompanied by an increase in $SO_3$, which as described previously can be problematic to both plant operations and in generating visible plumes. The inventive process offers a way of oxidizing elemental mercury to enhance capture by FGD equipment, but without promoting $SO_2$ oxidation to $SO_3$.

The SCR process and apparatus can employ any of several types of catalyst, and the basis of the proposed inventive process described herein does not depend on any particular catalyst type. Catalyst is commercially available from numerous suppliers around the world, and although not identical the features of most catalyst are similar. Most catalysts employ vanadium pentoxide as the active ingredient, stabilized in a base material that is primarily titanium dioxide. Each of the commercial catalyst suppliers employ a proprietary composition, additives, material processing techniques, and manufacturing techniques that are intended to improve the "activity" of the catalyst for NO removal, while minimizing the cost, and flue gas flow resistance. In addition, each supplier will include either a trace chemical additive or physical feature that minimizes the oxidation of $SO_2$ to $SO_3$. The technology of honeycomb catalysts was described in an early disclosure by Atsukawa (U.S. Pat. No. 4,282,115). Recent improvements as described by Kobyashi (U.S. Pat. No. 5,128, 301) are typical. Other recent contributions to the art of catalyst technology utilizing primarily titanium dioxides, vanadium pentoxide, and select additives are described by Vogel (U.S. Pat. No. 5,225,390). In addition to the previously cited compounds, other categories of catalyst composition exist, such as using zeolites, as disclosed by Farnos (U.S. Pat. No. 5,451,387). Further, a method of using the family of vanadium pentaoxide active materials on a unique substrate has been disclosed by Kato et. al. (U.S. Pat. No. 5,348,987). Still other variants of using vanadium as the primary active component in conjunction with molybdenum and nickel have been recently developed by Ku et. al. (U.S. Pat. No. 6,171, 566). In summary, a wide variety of catalyst composition exists, with the most common choice to date the use of vanadium stabilized in titanium oxide. For both the honeycomb-type and plate-type catalyst geometry, innovations are constantly being derived, such as by Hums et. al. (U.S. Pat. No. 6,287,524).

As mentioned above, the practical NOx removal is limited by the ability to contact essentially all injected ammonia reagent with NOx, at an active catalyst site. The inventive process solves this problem by improving the uniformity of $NH_3$/NO after the first layer, to improve NO removal in subsequent layers of the reactor.

This invention provides an additional method to mitigate $SO_2$ oxidation to $SO_3$, that is not available utilizing the conventional process design.

A consequence of this invention is eliminating the need for the hot-end in a Ljungstrom-type air heater, or alternatively a Rothemulle-type air heater. This invention, by reducing the total depth of heat exchange material required, will improve access for sootblowing that will maintain the air heater clean.

FIG. 9 depicts a schematic of an embodiment of a process and apparatus in accordance with this invention, identifying several features that distinguish this invention from conventional SCR technology. FIG. 9 shows the boiler 124, SCR reactor 126, and air heater 130 in a similar configuration as the conventional design. Flue gas 122 is generated by the boiler, and ammonia reagent is injected 120 similar to the conventional approach. Three layers of catalyst are used in this example, the same as in the conventional process design. In one specific embodiment of this invention, where the heat exchanger is directed to heating combustion air and not boiler feedwater or steam, a significant change is that the heat removal surface corresponding to the hot-end section of the Ljungstrom air heater has been eliminated, and is replaced with a separate heat exchanger 132 located between the first and second catalyst layer. A conventional tube-type heat exchanger (flue gas flowing within the tubes, combustion air flowing outside the tubes), for example, is integrated into the reactor between these two catalyst layers. This invention allows SCR equipment design and process conditions to be modified as follows:

Air Heater

The heat exchanger located following the first catalyst layer will be designed to reduce flue gas temperature by an amount that will significantly mitigate the $SO_2$ oxidation. The extent of flue gas temperature reduction by this heat exchanger will vary significantly with reactor design and fuel properties, and is anticipated in many cases to be 50-275° F., and usually approximately 100° F. Accordingly, with this first phase of heat removal accomplished within the reactor, the Ljungstrom air heater (130 of FIG. 9) need now only employ an intermediate and cold-end section, which can be constructed in one integrated piece. Referencing FIG. 8, the hot-end basket 90 is eliminated, and the intermediate 92 and cold-end 94 baskets are combined into a single piece basket. As a consequence, the one piece continuous element conveys sootblowing media momentum to the deposition zone, without dissipation, which improves the ability to keep surfaces clean. The most significant advantage of utilizing the one piece intermediate/cold end section is eliminating the void created between the hot-end and the intermediate section (93 in FIG. 8), which as described previously is believed to attenuate the effectiveness of the sootblowing media. The combined intermediate/cold end section will improve cleanability of the heat transfer surfaces, reducing the escalation of flue gas pressure drop due to ammonium sulfates and bisulfate accumulation, and thus avoid periods of limited load operation. The improved cleanability can optionally be used, as described later, to remove residual NH3 through reaction with $SO_3$ to form ammonium sulfates and bisulfates, thus eliminating one of the main concerns for residual $NH_3$ in flue gas.

SCR Process Reactor

The heat exchanger integrated into the reactor (132 of FIG. 9) can in concept be of any type—for a tube-type heat exchanger, flue gases passing within tubes with air external, or air passing within tubes with flue gas external. Any combination, number, and orientation of the heat exchange tubes can be utilized. Alternatively, a heat exchanger concept that does not employ tubes could be used.

As an illustrative example, FIG. 10 depicts a tube-type heat exchanger with hot flue gas flowing internal to the tubes 140, and combustion process air 142 flowing external to the tubes. FIG. 10 shows the tubes through which the flue gases pass to be aligned with the flow direction, but in concept the tubes can be oriented at an angle to achieve improved mixing of the flue gas and a more uniform distribution of $NH_3$. The relative size of the heat exchanger as shown in FIG. 10 is sized to reduce flue gas temperature approximately 50-275° F., lowering the reaction temperature of the catalyst layer at the exit of this heat exchanger accordingly. The actual size and the temperature reducing capability of the heat exchanger will vary with the type of fuel fired, in particular the content of $SO_3$ and NO that enters the reactor.

NO Removal and Residual NH3 Consumption

The presence of the heat exchanger, be it a tube-type design or any other type will provide flow resistance and induce turbulence, and thus improve the distribution of $NH_3$ and NO across the reactor. The result will be essentially "re-mixing" the $NH_3$ and NO at the inlet of the second catalyst layer. This will improve total process NO removal, control of residual $NH_3$, and perhaps both.

For the example case considered, it is assumed that the flue gas velocity within the cross-section of the reactor, thus reflecting the gas velocity both at the exit of the catalyst plane and entering the heat exchanger, is the usual design value of 15 aft/s. The heat exchanger will be selected to employ 2.5 in diameter tubes located on 7 inch centers. This geometry will reduce the effective flow area by 35%, elevating the gas velocity within the tube to 20 ft/sec. FIG. 10 shows the flow pattern anticipated at the inlet of the tubes, with zones of stagnation and flow recirculation 144, the latter induced by conservation of momentum of entrained flow. Similarly, the higher velocity jets of flue gas expand into the next chamber, again inducing zones of flow recirculation 146. Mixing is anticipated to occur due to (a) the zones of recirculation, at both the inlet and the outlet of the tube, and (b) the expansion of the higher velocity "jet" into the gas flow. In this manner, the heat exchanger is anticipated to simulate the actions of a perforated plate inserted into the flow stream, which is a commonly used device for improving mixing and velocity distribution.

The effect of this mixing pattern on $NH_3/NO$ distribution cannot be defined without computational flow dynamic (CFD) process modeling, and the results will depend on the reactor and heat exchanger design. However, for illustrative purposes, the benefit achievable by the improved mixing due to this concept can be identified based on simple calculations and a mass balance of $NH_3$. FIG. 11 compares the key features describing $NH_3/NO$ mixing and $SO_2$ conversion for the conventional SCR design and the inventive process. FIG. 11 shows the residual $NH_3$ from the inventive process is lower than from the conventional process at any given $NH_3/NO$ ratio, and that the standard deviation of the $NH_3/NO$ ratio entering any of the layers following the first layer is lower than the conventional design.

FIG. 11 compares the impact of the improved mixing on process operations and NOx removal. FIG. 11 shows the conventional linear relationship between NOx removal and $NH_3/NO$ ratio 150, similar to that previously shown in FIG. 2. Also shown is the residual $NH_3$ production, for two cases of $NH_3/NO$ mixing. The first 152, addresses the conventional design as described in FIG. 2 and FIG. 12 for the conventional SCR design, with a 5% standard deviation in $NH_3/NO$ at the reactor inlet. As shown in FIG. 12, the standard deviation of $NH_3/NO$ increases to 15 and 36%, respectively, at the inlet of catalyst layers 2 and 3. FIG. 11 also shows the residual $NH_3$ production for the inventive process 154, where the presence of the tube-type heat exchanger located after the first layer acts to decrease the standard deviation of $NH_3/NO$ ratio entering the second and third layer (shown in FIG. 12) to 10% and 20%, respectively. Consequently, the $NH_3/NO$ ratio where a residual $NH_3$ limit of 2 ppm is incurred can be increased from the baseline case of 0.90 156, to approximately 0.94 158. This change elevates NOx reduction to approximately 94%.

The benefits in terms of $NH_3/NO$ mixing provided by the heat exchanger and mixing body can also be provided by conventional static mixers such as those described by Henke (U.S. Pat. No. 4,737,345), or commercial products available from companies such as Koch and Sulzer, and be installed between the catalyst layers, perhaps preceding a interstage heat exchanger to further improve mixing. An example of such arrangement is discussed subsequently. Also, a static mixer could be installed between subsequent layers to improve NO removal, even if an interstage heat exchanger is not utilized, and the reactor operates at one temperature.

Such an interstage heat exchange can be used in "high-dust" atmospheres, that is for treating boiler flue gas with a content of particulate matter (e.g., fly ash) that is above 0.1 grains/scf.

Accordingly, as a consequence of the inventive process, an increase in $NH_3/NO$ of the entire reactor is allowed by reducing the residual $NH_3$ at any operating point. It is possible to operate the process at a $NH_3/NO$ ratio approaching unity, where extremely high NOx removal will be achieved but with residual $NH_3$ generated in quantities greater than 2-3 ppm, sometimes approaching 10 ppm or more. The residual $NH_3$ will react with $SO_3$ and form ammonium sulfates and bisulfates within the air heater, which can be more easily removed by soot blowers due to the inventive shape and use of a one-piece heat exchange material. The $SO_3$ value will be controlled by the catalyst oxidation, which in most cases will be specified to be minimized for all but the lowest sulfur coals. For medium and high sulfur coals, the levels of $SO_3$ will likely exceed the stoichiometric requirement for reaction with $NH_3$, forming preferably ammonium bisulfates. For the low sulfur coals, the residual $NH_3$ will over most of the operating period exceed the $SO_3$, preferentially forming ammonium sulfates, which are more amenable to removal by sootblowing. The compressed, one piece air heater will allow the necessary cleaning so that these compounds that are intentionally generated as a consequence of high residual $NH_3$ can be removed, enabling high NOx removal.

$SO_2$ Conversion

From a process standpoint, the flue gas temperature of the catalyst following the first layer will be reduced significantly. As shown previously in FIG. 5 describing experimental data, a 100° F. reduction in catalyst operating temperature from 650° F. can lower $SO_2$ conversion of a given catalyst layer by 50%. That the last layers will operate at reduced flue gas temperature is particularly significant, due to the observation earlier that the catalyst layers following the first layer contribute disproportionately to $SO_2$ conversion, due to the lower concentration of reagent $NH_3$ in flue gas. FIG. 12 compares the calculated values of the layer by layer contribution to $SO_2$ conversion, for both the inventive process and a conventional process design. Results are shown for a 3 layer reactor. As previously reported in FIG. 4 for the conventional design case, with a 680 F gas temperature, the first, second, and third layers are believed to oxidize 0.3%, 0.5%, and 0.7% of $SO_2$ to $SO_3$, respectively. These same results are repeated in FIG. 12. For the inventive case, the first layer oxidizes 0.3% of $SO_2$, but due to lower temperature, the work of Svenka suggests the second and third layers oxidize only 0.2% of $SO_2$. For the inventive case, the contribution of the last 2 layers is significantly reduced as a contributor to the total process $SO_2$ conversion.

Selective Oxidation of Hg

An additional attribute of the inventive process is the ability to transform elemental mercury to an oxidized state, without the associated deleterious impacts of higher $SO_2$ oxidation. This can be accomplished by the use of a special catalyst installed in the second, lower temperature stage of the SCR reactor. The catalyst will be designed to exhibit at the lower temperature stage a higher selectivity for Hg oxidation than for $SO_2$ oxidation.

FIG. 13 presents a conceptual display of the relative oxidation rates of mercury and $SO_2$ as a function of temperature for a NOx reducing catalyst. FIG. 13 is not known to represent any presently available commercial catalyst, but rather depicts performance characteristics of a catalyst that can be prepared given present technology. Specifically, catalyst of completely different composition other than those intended for SCR application have been developed to preferentially oxidize mercury, without oxidizing significant amounts of $SO_2$. Data such as in FIG. 13 is suggested to exist based on reported research results (Blythe, 2003, Richardson, 2002, and Lee, 2004). The results of Blythe (2003) show that specialized catalyst composed of materials as widely disparate as specially activated carbon, fly ash, and palladium-based compounds can provide significant activity for Hg oxidation without oxidizing $SO_2$, although at temperatures below that for conventional SCR application, specifically at the relatively low temperatures of an electrostatic precipitator (300 F). In FIG. 13, curves describing the oxidation of both Hg 160 and $SO_2$ 162 show that significant values of each are noted at 690° F. 164. This situation is believed to describe the performance of present SCR catalysts. However, in the inventive system, subsequent layers to the first can operate at 50-275° F. lower temperature. FIG. 13 shows that for this particular catalyst, operating at 590° F. 166 significantly decreases $SO_2$ oxidation activity, while having only a minor effect of mercury oxidation. Alternatively, as suggested by Chen (2002), Richardson (2002), and particularly Senior (2004), lowering the temperature of the SCR process and increasing the number of cooling steps—as provided by the interstage heat exchanger—will increase mercury oxidation 161. Thus, the ideal performance characteristics of the alternative mercury oxidizing catalyst will generally resemble those of FIG. 13, and allow operation at lower temperature, without significantly compromising NOx removal or Hg oxidation, and ideally enhancing the latter. The catalyst can be of any composition, and not limited to the examples cited of activated carbon, fly ash material, and palladium-based compounds. For example, a broad array of such catalysts has been described by Shintaro (Pat App 20030170159), and are known to be comprised of at least one active species selected from the group consisting of Pt, Pd, Ru, Rh, Rd, Ir, V, W, Mo, Ni, Co, Fe, Cr, Cu and Mn, to be supported by at least one carrier selected from the group consisting of $TiO_2$, $SiO_2$, $ZrO_2$, $Al_2O_3$ and $WO_3$ and/or zeolite. For catalysts described by these possible combination of constituents, the lower temperature will minimize the oxidation of $SO_2$ to $SO_3$, which Shintaro recognizes is harmful and proposes to mitigate by adjusting the content of the active ingredients (paragraph 059 of App 20030170159). It is also believed that the general category of oxidation catalyst, such as described by Voss (U.S. Pat. No. 5,491,120) and Yavuz (U.S. Pat. No. 6,274,107), both or which are incorporated herein by reference in their entireties, although for mobile application will be applicable with this concept, due to the lower operating temperature offered by the second stage. These catalysts can be ceria, optionally containing platinum or palladium, within a carrier of titania, zirconia, ceria-zirconia, and sulfur-resistant forms of alumina. Alternatively, as suggested by Downs (undated), simply lowering the flue gas temperature of a conventional SCR catalyst can promote oxidation of Hg from the elemental to the oxidized state. Specifically, Downs reported lowering the flue gas temperature from 740° F. to 390° F. increased the oxidation of Hg from 51 to 82%. The present concept does not contemplate a 250° F. flue gas temperature drop down to absolute levels this low, but this data suggests lowering flue gas temperature will improve Hg oxidation. Accordingly, a second benefit of this lowered temperature, in addition to minimizing the oxidation of $SO_2$, is to increase the oxidation of Hg. The ability to increase the oxidation of Hg, specifically by production of mercuric chloride, has been calculated by Chen (Chen, 2002). These calculations show at lower flue gas temperatures equilibrium thermodynamics favors the production of mercuric chloride, and further that extended residence time and introducing an additional cooling or quench step favors Hg oxidation. The inter-stage heat exchanger and special-purpose catalyst for oxidation of Hg promotes these conditions.

Selective Oxidation of Residual NH3

Another attribute of embodiments of the inventive process is to utilize a special-purpose catalyst layer to oxidize or transform residual $NH_3$ to NO or $N_2$, thereby minimizing the deleterious effects of the unreacted reagent on balance-of-plant equipment. This special purpose catalyst can be used either alone, or together with the Hg oxidation catalyst. The strategy of utilizing a two-stage SCR reactor, with the first stage dedicated to NOx removal, and the second dedicated to the destruction of residual $NH_3$ (by oxidation to NO), has been summarized by Speronello (U.S. Pat. No. 5,516,497). Specifically, Speronello describes a special purpose catalyst for the destruction of $NH_3$ by oxidation to NO, while the transformation of residual $NH_3$ to molecular $N_2$ can be catalytically promoted. Speronello describes a catalyst consisting of a metal promoter (e.g. Cu, Fe) supported within zeolite, the latter featuring special three-dimensional interconnected pores, with characteristic openings of 7-8 angstroms. As will be further described subsequently, the use of a special pore size of at most 8 angstroms, and possibly as low as 4 or 5 angstroms, is believed desirable to multiply the concentration of Cl within the catalyst and improve reaction rates with Hg. In addition to zeolite catalysts containing Cu and Fe, other catalysts containing ceria, platinum, and palladium as described by Yavuz (U.S. Pat. No. 6,274,107), which is incorporated herein by reference in its entirety may also be used. The catalysts intended to oxidize residual NH3 described by Hastings in U.S. Pat. No. 6,080,376, incorporated herein by reference in its entirety, are also believed to provide for oxidizing Hg. Similar to the case for Hg oxidation, the $SO_2$ conversion characteristics of these catalysts are well-known to strongly depend on flue gas temperature. Thus, to provide the benefits of $NH_3$ destruction while minimizing the deleterious effects of $SO_3$, the reduced temperature of the multi-stage reactor provides an excellent environment for the special-purpose catalyst.

Combined Special-Purpose Catalyst for Oxidation of Hg, $NH_3$

The data in the literature separately describing catalysts for the oxidation of $NH_3$ to NO, and for oxidation of Hg to $HgCl_2$ has revealed a surprising discovery. Significantly, and to date not previously identified, catalysts for destruction of $NH_3$ and oxidation of Hg can be of the same composition, and thus one catalyst layer can serve the dual purposes of NH3 and Hg oxidation. Specifically, these catalysts can essentially be the same, constituted from the same ingredients. Notably, Shintaro (Application 20030170159), which is incorporated herein by reference in its entirety, provides a broad description of the candidate constituents of a catalyst for Hg oxidation, which include Cu stabilized in zeolite material. Speronollo (U.S. Pat. No. 5,516,497), which is incorporated herein by reference in its entirety, describes the same major constituents for a catalyst for NH3 destruction. Shintaro has noted the possibility of strong oxidation of $SO_2$ to $SO_3$, and the need for possible countermeasures, based on lowering the content of the active ingredients. Neither Speronello or Shintaro teach utilizing the same catalyst for both oxidation of $NH_3$ and Hg, or that utilizing a two stage reactor with a lower temperature second stage can both accomplish SCR NOx removal and oxidation of Hg and/or $NH_3$ without excess $SO_2$ oxidation. Notably, several other constituents are identified in addition to Fe or Cu in zeolite, including Pt or Pd in base metal oxides. The anticipated tendency of both catalyst types to generate $SO_3$ as a byproduct can be mitigated to some degree by lower operating temperature, as is produced according to embodiments of this invention.

A yet further surprising aspect of this invention is that the physical features of zeolite catalyst may further promote oxidation of Hg, by concentrating contact with chlorides. Without being bound to any one theory, the application wishes to propose the following mechanism by which zeolite is preferred to oxidize Hg. Specifically, it is known that some coals are limited in Hg oxidation simply due to a lack of naturally-occurring chlorides. Indeed, the injection of chlorides or other oxidizing agents into the flue gas of coal-fired steam generators firing coals with inherently low chloride content is the basis of at least one patent promoting Hg oxidation (Cole, Application 20020114749). High specific surface area materials, such as zeolites with all pores being interconnected in all three crystallographic directions, are well-known for their ability to act as traps for molecules, accumulating their concentration within the pores and internal passageways that characterize catalyst substrates. In fact, three-dimensional beta-zeolite is used to trap hydrocarbons during vehicle startup, as described by Speronello (U.S. Pat. No. 5,516,497). The applicant submits that the same physical conditions inherent to the zeolites with all pores being interconnected in all three crystallographic directions can act to multiply the local concentration of chlorides within the catalyst to that of several factors greater than observed in the flue gas. If the pore size of the zeolite, specifically the three-dimensional type as described by Speronello is properly selected, then the catalyst not only provides oxidative capabilities, but exposes the Hg that contacts the surface of the catalyst to a high chloride concentration emanating from the pores. This pore size should be a maximum of 7-8 angstroms, but preferably as low as 5 angstroms. As an example, a low sulfur bituminous coal, such as from the Powder River Basin, may produce flue gas with 1-2 ppm of Hg, and 20-30 ppm of chlorides. This ratio of Hg to chlorides may be too low to support oxidation of Hg to $HgCl_2$, thus limiting the fraction of Hg that is oxidized. However, the physical features of the zeolite catalyst may concentrate Hg within the pores by a factor of 3-4, presenting effectively over 100 ppm of chlorides for the 1-2 ppm of Hg that contacts the catalyst surface. Accordingly, the ratio of Hg to chlorides on the catalyst surface may approach that of a medium or higher chloride coal, resulting in higher Hg oxidation, without requiring injection of additional chloride compounds that can damage balance-of-plant equipment. Yet another possible mechanism for zeolite material enhancing the oxidation of Hg is offered by Niksa (2002), who describes a skeletal heterogeneous mechanism for Hg, specifically alleging carbon as providing the oxidizing sites, which in fact could be provided by zeolite under the conditions described for this inventive process.

Another aspect of the use of special purpose catalysts to oxidize $NH_3$ to NO, or otherwise transform $NH_3$ to $N_2$, is the effect on the ratio of NO to $NO_2$. Given the general nature of oxidizing catalysts, it is likely that a non-negligible fraction of NO will be oxidized to $NO_2$. The oxidization of NO near the reactor exit—even by a small magnitude of 20%—will affect the ratio of $NO_2$ to NO in flue gas that enters a wet flue gas desulfurization (FGD) process. Based on the work described previously of Rosenberg (1980), increasing the $NO_2$ to NO ratio can be expected to reduce the sulfite content of an FGD slurry, which is described by Blythe (2004) as a means to prevent an FGD process from "re-emitting" oxidized mercury in the elemental state, thus increasing mercury removal.

As an example, consider a case where the concentration of NO and $NO_2$ entering an SCR process is 95 and 5 ppm, respectively, or about 19/1, reflecting typical well-controlled combustion process. By using the inventive concept to allow operating an SCR reactor at an overall $NH_3$/NO ratio of 0.98, and with the benefit of the $NH_3$-destroying special-purpose catalyst, the concentration of NO can be reduced to about 4 ppm. As the stoichiometric ratio of $NH_3$ to react with $NO_2$ requires 4 moles of $NH_3$ for each 3 moles of $NO_2$, and due to the extremely low concentration of $NO_2$, the removal of $NO_2$ is anticipated to be lower than for NO, with about 2 ppm of $NO_2$ remaining in the flue gas. Consequently, the high performance SCR process described herein can reduce the total of NO and $NO_2$ from 100 to near 6 ppm, with the ratio of $NO_2$ to NO increasing from 1 in 19, to 2 in 6 (or 1 in 3). Further, if the actions of the special-purpose catalyst oxidize 25% of the remaining NO to $NO_2$—or just 1 ppm—the ratio of $NO_2$ to NO increases to 1 part in 2. Based on the fundamental role of $NO_2$ and NO on FGD slurry sulfite content as described by Rosenberg (1980), an increase in the ratio of $NO_2$ to NO of this magnitude will increase the oxidation of sulfite to sulfate by a factor of 10. This should serve to maximize mercury removal. Consequently, the ratio of $NO_2$ to NO must be increased from the typical 1 in 20, to preferably 1 in 5, and more preferably 1 to 1 to derive these benefits, while exhibiting low absolute levels of less than 25 ppm combined of NO and $NO_2$.

Given the additional need to oxidize NO to $NO_2$, it is instructive to present an exemplary depiction of the many-faceted needs of this special-purpose catalyst to fully support the inventive process. FIG. 18 presents the ideal relationship between the catalytic oxidation or transformation of several species of import to the inventive process, and operating temperature. The specific relationships are the oxidation of Hg, $SO_2$, and NO, and the oxidation or otherwise transformation of $NH_3$ to NO or preferably $N_2$. The range of temperature depicted in FIG. 18, representing a reduction in temperature from 720° F. to 600° F., will typify many commercial applications. First, FIG. 18 depicts the reduction in $SO_2$ oxidation 190 by a factor of two from 0.9% to 0.45%, due to a 120 F decrease in temperature. As described previously, a reduction in $SO_2$ oxidation by this amount will significantly lower flue gas $SO_3$ emissions. Second, the 120 F reduction in temperature increases Hg oxidation 192, consistent with that described by Chen (2002) and others, in this case from 45% to 75%, increasing the quantity that is soluble and that can be absorbed by conventional flue gas desulfurization processes. Third, FIG. 18 shows that $NH_3$ oxidation or transformation to $N_2$ 194 decreases with lower temperature, but at 600 F provides 40% transformation of $NH_3$, adequate to reduce residual $NH_3$ from 4-5 ppm to a more tolerable 2-3 ppm. Finally, oxidation of NO to $NO_2$ 196 also decreases with temperature, but at 600 F provides 33%, sufficient to significantly alter the $NO_2$ to NO ratio entering an FGD process, minimizing sulfite and thus Hg re-emission. It should be noted that FIG. 18 is exemplary only, showing one of any number of variants of performance desired from the special purpose catalyst. Each variant of performance from the special-purpose catalyst will have in common the following: lowering temperature with the interlayer heat exchanger will decrease $SO_2$ conversion by at least a factor of ⅓ (e.g. from 0.9% to 0.6%); will preferably increasing Hg oxidation by ⅕ (e.g. 50% to 60%); while retaining at the second, lower stage temperature NO oxidation and residual $NH_3$ destruction of at least ⅕ (e.g. 20%) of inlet values. More preferably, $SO_2$ oxidation is lowered by a factor of two (e.g. 0.9% to 0.45%); Hg oxidation increases by half (e.g. 50% to 75%); while retaining at the second, lower stage temperature oxidation of NO and $NH_3$ destruction of at least ⅓ (e.g. 33%). Most preferably, $SO_2$ oxidation is lowered by more than a factor of two (e.g. 0.9% to 0.40%); Hg oxidation is doubled or more (e.g. 45% to 90%; while retaining at the second, lower stage temperature oxidation of NO and $NH_3$ destruction of at least ½ (e.g. 50%) of inlet values.

This invention can utilize a method to maintain the flue gas temperature of the first layer above a minimum, to avoid the deposition of ammonium sulfates and bisulfates on the catalyst. Any of the previously referenced methods described by Cohen (U.S. Pat. No. 5,943,865), Zieglev (U.S. Pat. No. 5,775,216), Wiechard (U.S. Pat. No. 5,555,849), each of which are hereby incorporated by reference in their entireties, can be applied. Equivalent techniques such as using a modulating damper to a small quantity of direct combustion air leaving the compressed, one stage air heater to go directly to the boiler and bypass the interstage heater after the first catalyst layer can be utilized 134. A minimum amount of air will always be necessary in the interstage heater exchanger to avoid overheating of tubes, but some of the air can be bypassed directly to the boiler, preserving the flue gas temperature in first layer above the minimum required to avoid ABS deposition.

The conventional design basis for selecting an SCR reactor temperature is to select a temperature that provides for suitable reaction of $NH_3$ with NO, but minimizes $SO_2$ oxidation. In many cases, this is the lowest temperature feasible that avoids ABS formation on the catalyst. The specific temperature of ABS formation has been shown by several investigators to be a function of relative and absolute concentration of $NH_3$, $SO_3$, and other gas constituents. Further, selecting the catalyst operating temperature must account for the role of the catalyst pores on the static gas pressure within the pore, which due to capillary action will change the ABS deposition temperature. Consequently, an additional margin in selecting the minimum temperature must be applied, such as described by Johnson (2002) and Matsuda (1982). Using the conventional SCR design approach, with the reactor operating at one temperature, the inlet conditions of NO and injected $NH_3$ reagent establish the minimum operating temperature of the entire reactor. At the reactor inlet, $NH_3$ levels will be 80-90% of NOx levels, typically several hundred and approaching for some units 800 ppm. The ABS formation temperature as described by investigators for these conditions may be 525-550° F. for coals with typical sulfur content, where the $SO_3$ is 5-30 ppm. The additional margin to avoid ABS condensation will raise this temperature further, perhaps another 20-50° F., and more in some cases.

But as FIG. 4 shows, the $NH_3$ content entering each catalyst layer is different, and decreases significantly as the reaction proceeds through the reactor. Thus, each catalyst layer in concept has a unique temperature of ABS deposition. The conventional design approach dictates that all catalyst layers must be treated as though the potential ABS temperature is the same for all, when in fact it is not due to constantly decreasing flue gas $NH_3$ content.

This invention does not force all catalyst layers to operate at the same temperature constraint as the first layer. Consequently, lowering the temperature of the catalyst layers that contribute the most to reactor $SO_2$ conversion is possible without incurring ABS deposition.

Also, FIG. 4 shows how the standard deviation of the distribution of $NH_3$/NO significantly deteriorates as the reaction progresses through subsequent catalyst layers. FIG. 4 shows that this high standard deviation of $NH_3$/NO entering the last layer—as determined by the mixing system established at the reactor inlet—limits the entire reactor—but mixing is only controlled as far as the reactor inlet.

The use of the tube-type heat exchanger, or another heat exchanger concept, and the further mixing this device induces serves to re-establish a more uniform mixing profile, allowing lower residual $NH_3$ and higher operating $NH_3$/NO ratio for the entire reactor. This heat exchanger could additionally or alternatively be utilized to either preheat combustion air, or boiler feedwater, or boiler water or steam from any other heat exchange duty, including the economizer section.

Further, any of these heat exchanger concepts—constructed either to assist in air preheat, or for boiler feedwater or steam, could be used in conjunction with a conventional static mixer preceding the heat exchanger to improve mixing. The general velocity of flue gas internal to an SCR reactor— usually about 15 aft/s—is sufficiently low so that a static mixer could be used between catalyst layers in a high dust environment, without inducing damage to the downstream catalyst layer. However, following a static mixer with an interlayer heat exchanger provides a flow "straightening" effect, that allows the use of larger deviations of the flow mixing plates than without the downstream interlayer heat exchanger. As a consequence, following the interlayer static mixer with an interlayer heat exchanger significantly improves the ability to lower the standard deviation of $NH_3$/ NO mixing between layers. The spacing between the static mixer and the entry plane of the interlayer heat exchanger is preferably 2-4 feet, to allow cleaning and removal of ash deposits from between the structures, but more preferably >4 to 8 feet, providing improved rectification of flow parallel to the catalyst, and access for cleaning. FIG. 19 depicts an embodiment of the arrangement, showing how the flue gas velocity vectors exiting the static mixer 200 employ additional space and time to further mix within the mixing zone 202 and then are redirected by the heat exchanger tubes 204 to a straight flow vector that is essentially parallel to the catalyst plates of grid surfaces. This arrangement will allow the use of static mixer designs that employ diverter plates inclined to the flow direction at between 5 and 25 degrees, and more preferably between 25 and 45 degrees to be used to significantly affect mixing between layers in the catalyst, without the possibility of the more extreme oblique flow angles inducing erosion to the catalyst.

The heat absorbing two-stage process reactor, by incorporating a conventional tube-type or other heat exchanger within the confines of an SCR process reactor NOx control, can provide at least three significant benefits.

First, the relocation of the "hot" element of the air heater heat exchange function to the reactor, as enabled by the conventional tube-type or other heat exchanger, allows compression of the air heater to a single, one piece heat exchange surface. This combined intermediate/cold end section is more amenable to cleaning by the sootblowing media, allowing both hot-end (entrance) and cold-end (exit) soot blowers to be installed and effectively utilized. As a consequence, the one piece combined intermediate/cold end section minimizing the deposition of ABS compounds will improve the resistance to incurring a load limit due to high flue gas pressure loss.

Second, the ability to lower the SCR process reactor operating temperature by a significant extent (50-275° F.) reduces the $SO_2$ conversion of the last 1-3 catalyst layers, and allows for the use of a specially-designed catalyst that promotes oxidizing Hg while minimizing the oxidation of $SO_2$. Thus, the layer or layers in a conventional SCR reactor design that contribute the most to $SO_2$ conversion are controlled by lowering their operating temperature by an amount that significantly reduces $SO_2$ oxidation. For a typical reactor design of 690° F., and a coal with a sulfur content of 3% (producing 2500 ppm of $SO_2$), lowering the temperature of the last layer by 100° F. to 590° F. provides significant reduction in process temperature while retaining an adequate margin above the calculated deposition temperature (560° F.), prior to assigning an operating margin for the pore capillary effect. For a typical SCR catalyst designed to provide 1.25% $SO_2$ conversion for an entire process, the reduction by 100° F. of the last layer could reduce the $SO_2$ conversion of the last layer to as low as 0.10%. As a consequence, total reactor $SO_2$ conversion will be reduced from 0.4-0.7%, a significant reduction. For the reference 2% sulfur coal, the $SO_3$ added to the flue gas by the SCR process is reduced from 23 to 10 ppm. The reduction in $SO_2$ oxidation offered by the advanced reactor design will be proportionally lower as the baseline $SO_2$ conversion is reduced, as possible with advanced, low $SO_2$ oxidation catalysts.

Third, the mixing of $NH_3$ and NO in flue gas entering the last catalyst layer(s) is improved due to the turbulence and flow distortions imposed by the heat exchanger elements. As a result, the measure of mixing that is normally invoked—the standard deviation—is reduced. For the example case in FIG. 12, the 15% standard deviation of NH3/NO ratio exiting the first catalyst layer was assumed reduced to 10%. The consequence of this improvement is an increase in the reagent $NH_3$ that can react with NO, and by allowing a higher overall reactor $NH_3$/NO ratio (while maintaining the residual $NH_3$ limit), high NOx removal. In fact, the increase in $NH_3$/NO ratio could be significant and approach unity, as the excess residual $NH_3$ would be captured as ABS within the compressed one piece air heater, and successfully cleaned.

Accordingly, this invention exploits unique and relatively unrecognized characteristics of the last catalyst layer to achieve benefits that propagate upward to the other layers of the reactor, as each catalyst layer can now enjoy a higher $NH_3$/NO ratio.

Fourth, offering a lower temperature environment to allow for the use of a special purpose catalyst that can serve any of several purposes. These include oxidizing Hg to $HgCl_2$, or the elimination of residual $NH_3$, by oxidation to NO, or transformation to $N_2$. Either of these oxidation steps, by being conducted in a relatively low temperature environment, minimizes the deleterious effects of $SO_2$ oxidation to $SO_3$, that is usually associated with such transformations by conventional SCR catalysts, or special oxidation catalysts formulated for mobile duty. Most unconventionally, this single catalyst layer could be used to oxidize Hg and oxidize or transform $NH_3$, by using either one catalyst layer of uniform composition, or two "half" layers within the envelope of a full conventional layer. A further benefit of a special-purpose oxidizing catalyst is to transform perhaps 20% or more of NO to NO2, favorably affecting FGD chemistry to improve mercury capture.

Fifth, introducing a tube-type or other heat exchanger after the first catalyst layer to lower flue gas temperature by preferably 25-125° F., or more preferably 125-275° F., will reduce the surface area required by the heat exchange baskets in the Ljungstrom-type heat exchanger, narrowing the deviation in the average and minimum metal temperature of heat exchanger baskets. For example, a decrease in temperature of flue gas entering the Ljungstrom-type air heater of 150° F. means the inlet of a conventional Ljungstrom-type heat exchanger will be approximately 500° F. at full load. FIG. 17 illustrates a comparison for both a conventional Ljungstrom-type air heater and a compressed Ljungstrom-type air heater designed in accordance with an embodiment of this inventive process the average, minimum, and maximum metal temperature of heat exchange elements, as a function of depth through the air heater. FIG. 17 shows the minimum cold-end metal temperature 180 is lower than the average cold-end metal temperature 184 by 32° F. at the air heater outlet (at 52 inches depth). For the inventive case, where the interlayer heat exchanger eliminates the need for approximately the first 20 inches of the air heater, and less heat exchange material is installed, the minimum cold-end metal temperature 184 is 15° F. less than the average cold-end metal temperature 182. As a consequence, for the same minimum cold-end metal temperature of 270° F., and thus the same exposure to $SO_3$ corrosion, the average cold-end metal temperature can be 17° F. lower (difference between 15° F. and 32° F.). The lower flue gas temperature by 17° F. corresponds to an improvement in boiler thermal efficiency of almost 0.5%, a significant improvement. Accordingly, the reduced variation in cold-end metal temperature enabled by the inventive process allows a lower average cold-end metal temperature, increasing plant thermal efficiency while not increasing corrosion potential.

The concept of utilizing the interstage heat exchanger to preheat combustion air, and thus compress the air heater, although advantageous as previously described, is not essential to the success of the concept. Specifically, depending on the application, particularly the retrofit of the SCR reactor to an existing power plant, it may not be feasible to modify the combustion air ductwork and handling equipment to accommodate preheating of combustion air by the inter-stage air heater. In this case, the benefits of the multi-stage reactor can be derived by utilizing the interstage heat exchanger for a purpose other than the preheating of combustion air. Specifically, utilizing the interstage heat exchanger to preheat boiler feedwater is one logical application. The retrofit of supplementary heat exchangers to increase the temperature of boiler feedwater is a well-known method of increasing boiler efficiency, and improving plant heat rate (EPRI, 1985). Such heat exchangers can be configured in an array of layouts and sizes, and located between the catalyst layers of a SCR reactor.

One common design of a heat exchanger to increase the temperature of boiler feedwater or steam is to use tube bundles, with the water or steam liquid internal to, and flue gas external to, the heat exchange tubes. Similar to the heat exchanger for combustion air preheat, the design of the heat exchanger is selected to maximize the mixing of flue gas exiting the catalyst layer, to improve the $NH_3$/NOx distribution and thus the performance of the subsequent catalyst layer. This can be accomplished by the arrangement and relative size of the heat exchange tubes within the bundle.

FIG. 14 depicts the cross-section of the multi-stage SCR reactor containing an inter-stage heat exchanger for heating boiler feedwater or steam, following the first catalyst layer. The cross section of the heat exchanger is shown in more detail in FIG. 15. As shown, the preferred arrangement of tubes is staggered, to induce mixing. The diameter of the tubes is anticipated to be between 1.5 and 3 inches. The spacing between tubes, as measured on a center-to-center basis, is equal to about 1.5-2.5 diameters. This spacing, as shown in detail in FIG. 15, diverts the streamlines of flue gas from a straight transit, intended to induce mixing, but not so much as to induce a significant flue gas pressure drop, or allow for accumulation of fly ash between the tubes. The depth of the tube bundle will vary, depending on the flue gas velocity, inlet temperature of the boiler feedwater, and the desired amount of feedwater preheat. Using basic heat exchanger design, it is anticipated that the use of a 4 foot depth tube bundle, employing tubes of 2.5 inch diameter, and arranged on a centerline to centerline basis of 1.5 diameters (3.75 inches), will lower flue gas temperature from 700 to 600° F., while increasing boiler feedwater temperature from 10-20° F. This will derive an improvement to power plant efficiency, or heat rate, that is significant in the context of derived fuel savings.

EXAMPLES

Below are described three prophetic examples, teaching how the flexibility of the reactor can be utilized to solve different problems. The inventive concept can be applied to a wide variety of application conditions, each with unique and different needs. Specifically, some applications may offer challenging NOx reduction, while relative ease of providing for a high state of mercury oxidation. Conversely, other applications may be most challenged by controlling production of $SO_3$, with both Hg oxidation and NOx control less difficult. The three examples offered exhibit how design of the inventive multi-stage reactor can be applied to a wide variety of conditions.

The multi-stage advanced reactor is anticipated to be capable of extremely low NOx emissions, for some applications to approximately 0.01 lbs/MBtu and less (equivalent to less than 10 ppm NOx). The oxidation of Hg is anticipated to be required for some applications to 95%, to achieve greater than 90% Hg removal when used in conjunction with a conventional flue gas desulfurization process. Control of $SO_2$ oxidation to less than 1% and preferably to less than 0.5% may be desired for applications that utilize medium or high sulfur content coal.

Each of these constraints is reflected in the following three examples. These examples are presented to show how the innovative concept can be designed, and assumes the designer has access to a physical cold flow or computational fluid dynamic (CFD) model, to define the fluid flow field and mixing conditions. The examples follow the conventional approach commercial SCR designers use: specify the details of the SCR design in terms of the basic process engineering factors, and describe these in a catalyst procurement specification that is sent to catalyst suppliers. The catalyst suppliers respond to the catalyst procurement specification with catalyst design defined by composition (although most of the details are held proprietary), physical characteristics (pitch, wall thickness, specific surface area, etc), and volume in each layer.

Example 1

High Sulfur Eastern Bituminous coal. The subject coal features high sulfur, medium Hg, and high chloride content. The application is for a new unit, that must provide 95% NOx removal from an inlet rate of 0.18 lbs/MBtu, to meet an outlet target of less than 0.01 lbs/MBtu. Further, 90% Hg oxidation is required, while controlling byproduct $SO_3$ to 0.60% $SO_2$ conversion.

For this application, the relatively high chloride content is anticipated to elevate inherent Hg oxidation without SCR to perhaps 85%; thus only a modest increase with SCR to attain 90% is required. However, concern exists for control of $SO_3$, as a precursor for sulfuric acid. Accordingly, special-purpose catalysts for oxidation of $NH_3$ or Hg will not be used; rather the reactor will focus on a high NOx reduction, low $SO_2$ conversion design.

The embodiment for this construction for the new plant will utilize 3 catalyst layers, the first separated from the second and third by a heat exchanger, designed to provide 100° F. temperature reduction.

The first layer is designed to operate at 700° F. at full load. Either cold flow modeling or computational fluid dynamics is used to establish the inlet reactor process conditions, which calls for a temperature range of 20° F., an RMS distribution of velocity of +/−10%, and an RMS distribution of $NH_3$/NO ratio of +/−5%, relative to mean values. The additional mixing provided by the heat exchanger will reduce the RMS distribution of the $NH_3$/NO ratio exiting the first layer from +/−25% to a value entering the second layer of +/−10% with a similar improvement in velocity and temperature distribution.

As the heat exchanger is designed to provide a temperature reduction of 100° F., the second layer (and third when added) will operate at 600° F. at full load. A procurement specification is prepared for both the first and the latter two (second and third) layers, describing the permitted variation in temperature, velocity, and $NH_3$/NO ratio previously described, and the desired performance in terms of NO removal, residual $NH_3$, Hg oxidation, and $SO_2$ conversion. Commercial catalyst suppliers, for examples Argillion, Cormetech, Hitachi, or Ceram, may be selected to provide product catalyst for the first and second stage layers, and estimate the operating hours when a third layer must be added to the second (lower temperature stage) to maintain NOx removal and control of residual $NH_3$.

The catalyst supplier provides a catalyst design, including exact geometric characteristics and volume, that meets the requirements of the performance specification, and projects that the third layer that will operate at 600° F. is required to be installed after 16,000 hours to lower residual $NH_3$ to below 2 ppm and maintain 95% NOx removal.

The first layer will provide 0.4% $SO_2$ oxidation, typical of that incurred with conventional SCR design for a catalyst of the composition required to deliver extremely high NOx reduction. The reduction in process temperature by 100° F. limits $SO_2$ conversion of the second layer to 0.2%. The third layer, when added, also provides 0.2% $SO_2$ conversion. At the time the third layer is added, the combined $SO_2$ conversion of the first two layers combined will decrease to 0.4%, thus the total remains at 0.6%, within the specification.

In this example, adequate Hg oxidation and control of residual $NH_3$ could be attained due to the characteristics of the coal. The special-purpose catalysts for either Hg oxidation or $NH_3$ destruction by oxidation are not required, but the unique construction features of the reactor exploited to maximize NO removal and minimize $SO_2$ oxidation.

In the event that high residual $NH_3$ is generated from achieving the extremely low NOx removal conditions, the one-piece conventional Ljungstrom-type air heater is amenable to routine removal of deposits of ammonium sulfates and bisulfates, avoiding higher flue gas pressure drop. Further, the reduction in flue gas temperature to the inlet of the Ljungstrom-type heat exchanger by 100° F. allows the average cold-end metal temperature to be reduced by 12° F., deriving an improvement of 0.25% to plant heat rate.

Example 2

Low Sulfur Western Subbituminous coal. The subject coal features low sulfur, medium Hg, and low chloride content. The coal also contains significant alkalinity in the fly ash, which acts as a natural buffer to neutralize $SO_3$ produced. The application of the multi-stage reactor will be on a new unit that must achieve 90% NOx removal from 0.13 lbs/MBtu to attain less than 0.013 lbs/MBtu. Further, 90% Hg oxidation is desired. The oxidation by the catalyst of $SO_3$ is of secondary concern, due to the inherent low sulfur content in PRB-derived flue gas, and relatively high ash alkalinity.

For this application, the low chloride content of the coal will not promote inherent Hg oxidation; however due to the low sulfur content and high ash alkalinity concern for $SO_3$ is secondary. Accordingly, a special-purpose catalyst for oxidation of Hg will be used; the reactor will focus on a high NOx reduction, high Hg conversion design while maintaining considerations for minimizing $SO_3$.

The embodiment for this design utilizes 3 layers for conventional (e.g. approximately 1 meter length) catalyst layers, the first layer separated from the others by a heat exchanger, designed to provide 80° F. temperature reduction.

The first layer will be constructed to operate at 660° F. at full load, featuring a full layer of catalyst specified from a conventional supplier. Either cold flow modeling or computational fluid dynamics is used to establish the inlet reactor process conditions, which calls a temperature range of 25° F., an RMS distribution of velocity of +/−11%, and an RMS distribution of $NH_3/NO$ ratio of +/−4%, relative to mean values. The additional mixing provided by the heat exchanger will reduce the RMS distribution of the $NH_3/NO$ ratio exiting the first layer from +/−28% to a value entering the second later of +/−12% with a similar improvement in velocity and temperature distribution.

As the heat exchanger is designed to provide a temperature reduction of 80° F., the second layer (and third when added) will operate at 580° F. at full load. A procurement specification is prepared for both the first and the latter two (second and third) layers, describing the permitted variation in temperature, velocity, and $NH_3/NO$ ratio previously described, and the desired performance in terms of NO removal, residual $NH_3$, Hg oxidation, and $SO_2$ conversion. For this case, given the extremely high alkalinity of the ash characteristic to PRB coal, the catalyst specification will allow for residual NH3 higher than the typical 2 ppm to be tolerated within the reactor, extracting higher NOx removal. Commercial catalyst suppliers, for example Argillon, Cormetech, Hitachi, or Ceram, can be selected to provide product catalyst for the first two layers, and estimate the operating hours when a half-layer of additional catalyst must be installed to maintain NOx removal and control of residual $NH_3$. The catalyst supplier provides a catalyst design for the first three layers, including exact geometric characteristics and volume, that meets the requirements of the performance specification, allowing 3 ppm residual $NH_3$, above the normally accepted threshold of 2 ppm. The catalyst supplier estimates the third catalyst layer, operating in the second, lower temperature stage of 580° F., must be filled with a half-layer section to control both residual $NH_3$ to 3 ppm and NOx to at least 90% after 16,000 hours.

A fourth special purpose half-layer may be installed to promote the oxidation of $NH_3$ to $N_2$, and Hg to $HgCl_2$. The performance specification for this special-purpose catalyst describes that 50% oxidation of $NH_3$ to $N_2$ and a total of 90% oxidation of Hg to $HgCl_2$ is required, while restricting $SO_2$ oxidation to 0.1%. As an example, in this case a special-purpose catalyst provided by a supplier such as Engelhard could be utilized, employing Cu-based materials stabilized in a zeolite substrate, as described by Speronello; alternatively Shintaro describes similar catalysts that can be utilized. A procurement specification is issued to these candidate suppliers describing the process conditions in the second, lower temperature stage in terms describing the permitted variation in temperature, velocity, and $NH_3/NO$ ratio; also the desired performance in terms of NO removal, residual $NH_3$, Hg oxidation, and $SO_2$ conversion. Given the lower operating temperature compared to conventional SCR design, the supplier can utilize a relatively high content of active material, even strongly oxidizing materials such as platinum or palladium, as concern for the oxidation of $SO_3$ at the relatively low temperatures is moderated. The ability of such catalyst to provide this degree of Hg oxidation is also recognized by the work of Blythe (2003).

Due to the low flue gas sulfur content, a significant quantity of vanadium can be utilized in the conventional catalyst to assure the 2 and ½ layers can provide the necessary NOx control. Regarding $SO_2$ conversion, the first layer will provide 1.0% $SO_2$ oxidation, and the second 0.6%. The third layer half-layer, when added, provides 0.4% $SO_2$ conversion; accordingly the total $SO_2$ conversion never exceeds 2.0%. The special-purpose half-layer of Hg oxidation catalyst adds 1% $SO_2$ oxidation. Given the relatively low flue gas $SO_2$ content of 350 ppm, the total of 3% $SO_2$ conversion equates to 10 ppm $SO_3$, below the threshold for operating difficulties.

In this application, adequate NOx reduction and control of $SO_2$ oxidation could be attained due to the characteristics of the coal, and ability to utilize significant quantities of vanadium. The special-purpose catalyst for $NH_3$ oxidation further augmented NOx control by allowing a higher residual $NH_3$ from the vanadium-based, conventional catalyst, and provided for Hg oxidation.

In the event that high residual $NH_3$ is generated from achieving the extremely low NOx removal conditions, the one-piece conventional Ljungstrom-type air heater is amenable to routine removal of deposits of ammonium sulfates and bisulfates, avoiding higher flue gas pressure drop. Further, the reduction in flue gas temperature to the inlet of the Ljungstrom-type heat exchanger by 80° F. allows the average cold-end metal temperature to be reduced by 10° F., deriving an improvement of 0.20% to plant heat rate.

Example 3

Medium Sulfur Eastern Bituminous coal. The subject coal features medium levels of sulfur, high content of Hg, and low-intermediate chloride content. The coal will be fired in an existing unit, that must achieve 97% NOx removal from SCR process inlet levels of 0.30 lbs/MBtu, to emit at less than 0.01 lbs/MBtu. Hg oxidation of 95% is required, and $SO_3$ oxidation must be limited to 1%.

For this application, the inherent Hg oxidation is anticipated to be moderate; and concern exists for control of $SO_3$, as a precursor for sulfuric acid. Accordingly, a special-purpose catalyst to oxidize Hg and oxidize or otherwise transform $NH_3$ to $N_2$ will be utilized.

The embodiment for this design will utilize 4 catalyst layers, the first separated from the others by a heat exchanger, designed to provide 125° F. temperature reduction.

The first layer will be constructed to operate at 720° F. at full load, featuring a full layer of approximately 1 meter of catalyst specified from a conventional supplier. Either cold flow modeling or computational fluid dynamics is used to establish the inlet reactor process conditions, which calls for a temperature range of 18° F., an RMS distribution of velocity of +/−12%, and an RMS distribution of $NH_3/NO$ ratio of +/−3%, relative to mean values. The additional mixing provided by the heat exchanger will reduce the RMS distribution of the $NH_3/NO$ ratio exiting the first layer from +/−23% to a value entering the second later of +/−10% with a similar improvement in velocity and temperature distribution.

As the heat exchanger is designed to provide a temperature reduction of 125° F., the second layer (and third when added) will operate at 595° F. at full load. A procurement specification is prepared for both the first and the latter two (second and third) layers, describing the permitted variation in temperature, velocity, and $NH_3/NO$ ratio previously described, and the desired performance in terms of NO removal, residual $NH_3$, Hg oxidation, and $SO_2$ conversion. Commercial catalyst suppliers, for examples Argillon, Cormetech, Hitachi, or Ceram, can be selected to provide product catalyst for the first two layers, and estimate the operating hours when additional catalyst must be installed to maintain NOx removal and control of residual $NH_3$. The catalyst supplier delivers a design that meets these NOx removal requirements, but only when operating at a relatively high $NH_3/NO$ ratio of 0.99, and generating 6 ppm of residual $NH_3$. The third catalyst layer should be installed after 16,000 hours, and also operates at 595° F.

Achieving outlet NOx less than 0.01 lbs/MBtu requires 97% NOx reduction. The design strategy employs a $NH_3$/NO ratio of 0.99, providing for 98% NOx removal but also unacceptably high residual $NH_3$, at 6 ppm. Consequently, for the fourth layer, a specification is prepared for a special-purpose catalyst that oxidizes 65% of $NH_3$ to NO, and 90% of Hg to $HgCl_2$. A specialty supplier such as Engelhard offers a catalyst with copper and beta-zeolite for the active ingredient, and a second supplier may propose a palladium-based catalyst, that would not be feasible under conventional SCR conditions due to excess $SO_2$ conversion. At the lower, second-stage temperature, the Cu-impregnated into beta-zeolite provides for oxidizing 4 ppm of $NH_3$ into NOx, which added to the 2% of NO that escapes reduction (6 ppm) equates to 10 ppm, or approximately 0.01 lbs/MBtu.

Finally, Hg oxidation will be provided by the special-purpose catalyst to provide for 90% oxidation of inlet Hg to $HgCl_2$. The catalyst employs Cu impregnated into beta-zeolite, which provides for accumulating Cl within the within the three dimensional pore structure, significantly increasing contact between the Hg on the surface of the catalyst and the chlorides within the pore structure.

Regarding $SO_2$ conversion, the first catalyst layer will provide 0.4% $SO_2$ oxidation, and the second 0.1%. The third layer, when added, will provide 0.1% $SO_2$ conversion. At the time the third layer is added, the combined $SO_2$ conversion of the first two layers combined will have decreased from 0.5% to 0.4%, thus the total will remain at 0.5%, within the specification. Both the $NH_3$ oxidation and Hg oxidation catalyst each add 0.2% $SO_2$ conversion, elevating the total to 0.90%.

This example shows that due to extremely high inlet NOx, the desired target of 0.01 lbs/MBtu can be attained only by (a) operating near the stoichiometric ratio of $NH_3$/NO, utilizing the interlayer mixing as offered by the heat exchanger to maximize NO reduction, (b) eliminating the residual $NH_3$ due to the high $NH_3$/NO ratio with as special catalyst, and (c) utilizing the same additional special-purpose catalyst for Hg oxidation.

It is possible that different catalysts could be used for Hg oxidation and $NH_3$ oxidation, depending on the supplier and results of specific laboratory development trials.

In the event that high residual $NH_3$ is generated from achieving the extremely low NOx removal conditions, the one-piece conventional Ljungstrom-type air heater is amenable to routine removal of deposits of ammonium sulfates and bisulfates, avoiding higher flue gas pressure drop. Further, the reduction in flue gas temperature to the inlet of the Ljungstrom-type heat exchanger by 125° F. allows the average cold-end metal temperature to be reduced by 16° F., deriving an improvement of 0.40% to plant heat rate.

The following is a list of references, all of which are incorporated by reference in their entireties.

CITATION REFERENCE

Akron-Beacon "Blue Haze Worries Town", Akron Beacon Journal, Aug. 2, 2001. Journal, 2001

AWMA, 2001 Air & Waste Management Association, "Proceedings of the A&WMA Specialty Conference on Mercury Emissions: Fate, Effects, and Control", Aug. 20-23, 2001, Chicago, Ill.

AWMA, 2003 Air & Waste Management Association, "Proceedings of the Combined Power Plant Air Pollutant Control Mega Symposium", May, 2003, Washington, DC.

AWMA, 2004 Air & Waste Management Association, "Proceedings of the Combined Power Plant Air Pollutant Control Mega Symposium", Aug. 30-Sep. 2, 2004, Washington, DC.

Blythe, 2003 Blythe, G. et. al., "Pilot Testing of Oxidation Catalysts For Enhanced Mercury Control by Wet FGD", Proceedings of the 2003 Combined Power Plant Air Pollutant Control "Mega" Symposium, May, 2003, Washington, D.C.

Blythe, 2004 Blythe, G. et. al., "Bench-Scale Evaluation of the Fate of Mercury In Wet FGD Systems", Proceedings of the 2004 Combined Power Plant Air Pollutant Control "Mega" Symposium, Aug. 30-Sep. 2, 200, Washington, D.C.

Bock, 2003 Bock, Jeanette et. al., "Mercury Oxidation Across SCR Catalysts of Flue Gas With Varying HCl2 Concentrations", Proceedings of the 2003 Combined Power Plant Air Pollutant Control "Mega" Symposium, May, 2003, Washington, D.C.

Bondurant, 1999 Bondurant, L. P., "SCR Compatibility for the Ljungstrom Air Preheater, Proceedings of the EPRI/EPA/DOE Combined Utility Air Pollution Control Symposium: The Mega Symposium, August, 1999, Atlanta, Ga.

Bosch, 1988 Bosch, A. and Janssen, F., "The Catalytic Reduction of Nitrogen Oxides: A Review on the Fundamentals and Technology", KEMA Scientific & Technical Reports 6 (1): 1-55 (1988)

Counterman, 1999 Counterman, W. et. al., "Ljungstrom Air Preheater Fouling Due To SCR Ammonia Slip", presentation to the 1999 EPRI SCR Workshop On Selective Catalytic Reduction, Orlando, Fla., March 1999 (see third page)

Chu, 2002 Chu, P. et. al., "Evaluation of the Effect of SCR and Ammonia On Mercury at Six Coal-Fired Power Plants", Presentation to the Electric Utilities Environment Conference, January, 2002, Tucson, Ariz.

Chu, 2003 Chu, P. et. al., "Power Plant Evaluation Of The Effect of SCR Technology on Mercury", Proceedings of the 2003 Combined Power Plant Air Pollutant Control "Mega" Symposium, May, 2003, Washington, D.C.

Chu, 2004 Chu, P. et. al., "Understanding The Catalytic Effect of SCR On Mercury", Presentation to the Electric Utilities Environment Conference, January, 2004, Tucson, Ariz.

Downs, undated Downs, W., et. al., "SCR Catalyst Impact on Mercury Speciation".

EPA, 2000 EPA ICR Reports, http:www.epa.gov/ttn/uatw/combust/utiltox/utoxpg.html (October, 2000)

EPRI, 1985 EPRI, "Proceedings: 1985 Heat-Rate Improvement Workshop", EPRI CS-4736, September, 1986

Gutberlet, 1992 Gutberlet, H., et. al., "Mercury In Bituminous Coal Furnaces With Flue Gas Cleaning Plants", VGB Kraftwerkstechnik 1992, 72, 586-591.

Hastings, 2003 Hastings, T. W. et. al., "Zero Ammonia Slip Technology for Combined Cycle Gas Turbine Exhaust", presented at Power-Gen International 2003, December, 2003, Las Vegas, Nev.

Johnson, 2002 Johnson, Robert et. al., "U.S. Utility Coal-fired SCR Applications: SCR Catalyst-Specific Issues and Operating Experiences", paper presented to the Institute of Clean Air Companies Forum '02, October, 2002.

Laudel, 2003 Laudel, D. et. al., "Mercury Speciation At Power Plants Using SCR and SNCR Technology", EM, Air & Waste Management Association's Magazine for Environmental Managers" February, 2003.

Lee, 2004 Lee, C. K. et. al., "Effect of SCR Catalyst on Mercury Speciation", Proceedings of the 2004 Combined Power Plant Air Pollutant Control "Mega" Symposium, Aug. 30-Sep. 2, 200, Washington, D.C.

Matsuda, 1982 Matsuda, S. et. al., "Deposition of Ammonium Bisulfate in the Selective Catalytic Reduction of Nitrogen Oxides with Ammonia", Ind. Eng. Chem Prod. Res. Dev., 1982, 21, 48-52.

Muzio, 2002 Muzio, L. J. et. al., "Overview and Status of Post-Combustion NOx Control: SNCR, SCR, and Hybrid Technologies", International Journal of Environment and Pollution, Volume 17, Nos. 1/2, 2002.

Niksa, 2002 Niksa, Stephen et. al., "A Mechanism for Mercury Oxidation in Coal Derived Exhausts, Journal of the Air and Waste Management Association, Volume 52, August, 2002.

Chen, 2002 Chen, Z. et. al., "Modeling of Mercury States in Coal-fired Utility Boilers", presentation to the 27th International Technical Conference on Coal Utilization & Fuel Systems, Mar. 4-7, 2002, Clearwater, Fla.

Richardson, 2002 Richardson, Carl et. al., "Effect of NOx Control Processes On Mercury Speciation In Utility Flue Gas", Presentation to the Electric Utilities Environment Conference, January, 2002, Tucson, Ariz.

Rosenberg, 1980 Rosenberg, H. Et. al., "NOx Influence on Sulfite Oxidation and Scaling in Lime/limestone Flue Gas Desulfurization (FGD) Systems, Environmental Science and Technology, 0013-936X/80/08140-0470801.00/0

Senior, 2004 Senior, C. et. al., "Oxidation of Mercury Across SCR Catalysts In Coal-fired Power Plants", presentation to the U.S. DOE NETL Mercury Control Technology R&D Program Review, July, 2004, Pittsburgh, Pa.

Svachula, 1993 Svachula, et. al., "Oxidation Of $SO_2$ to $SO_3$ Over Honeycomb Denoxing Catalysts", Industrial Engineering Chemical Research, 1993, 32, 826-834.

Winberg, 2004 Winberg, S. E. et. al., "Evaluation of Mercury Emissions from Coal-Fired Facilities with SCR/FGD Systems", Summary of Research Presented to the U.S. Department of Energy Mercury Control Technology R&D Program Review Meeting, Jul. 14-15, 2005.

What is claimed is:

1. A method for the selective catalytic reduction of nitrogen oxides, comprising:
   introducing a reducing agent into a flue gas containing nitrogen oxides;
   after the introducing and before passing the flue gas and reducing agent through a heat exchanger, passing the flue gas, at a first gas velocity, through at least a first layer of nitrogen oxide reducing catalyst where an amount of nitrogen oxides in said flue gas is reduced;
   after the passing the flue gas through the at least a first layer, passing the flue gas, at a second gas velocity that is higher than the first gas velocity, through at least one heat exchanger that removes heat from the flue gas and also mixes the flue gas and the reducing agent; wherein the heat removed from the flue gas is transferred to a water heater; and
   after the passing the flue gas through the heat exchanger, passing the flue gas through at least one additional layer of nitrogen oxide reducing catalyst where an additional amount of nitrogen oxides in the flue gas is reduced.

2. The method of claim 1 wherein said at least one heat exchanger is at least one interstage heat exchanger, that lowers flue gas temperature, and acts as a mixing body to lower the standard deviation of the $NH_3$/NO ratio entering catalyst layers after the first catalyst layer, thus providing a higher amount of consumption of both ammonia and NOx in a reactor than would be achieved in the absence of the at least one interstage heat exchanger.

3. The method of claim 2 wherein the at least one interstage heat exchanger transfers 25-275° F. of temperature.

4. The selective catalytic reduction method of claim 3, wherein a lower flue gas temperature by a magnitude of 25-275° F. lowers the oxidation of $SO_2$ across each layer by a factor of 20-90%, and/or increases the oxidation of mercury across each layer by a value of 20 to 300%, both compared to the rate that would normally be observed without the reduced flue gas temperature.

5. The method of claim 1, further comprising, before passing the flue gas through the at least one additional catalyst layer, passing the flue gas through a separate static mixing device to mix reducing agent and NO, further mixing the partially reacted $NH_3$ and NO.

6. The method of claim 1, further comprising passing the flue gas through at least one additional layer containing a special-purpose catalyst selected from the group consisting of a) a catalyst for oxidation of mercury, of a composition such that reducing the temperature by 40 to 275° F. to the second stage operating temperature decreases the $SO_2$ conversion by at least a factor of ¼, but affects Hg oxidation either only marginally or alternatively increases Hg oxidation, said special-purpose catalyst having a formulation preferential to Hg oxidation, b) a catalyst for the oxidation of $NH_3$ to either NO or $N_2$, said special-purpose catalyst having a formulation preferential for $NH_3$ oxidation, so that said reduction in temperature by 40 to 275° F. to the second stage operating temperature decreases the $SO_2$ conversion by at least a factor of ¼, and provides $NH_3$ oxidation of at least 10%, and c) a catalyst for the oxidation of NO to $NO_2$, said special-purpose catalyst having a formulation preferential for NO oxidation, so that said reduction in temperature by 40 to 275° F. to the second stage operating temperature provides for oxidation of NO to $NO_2$ of at least 10% and d) a catalyst for any combination of a) and b) and c).

7. The method of claim 6, wherein the additional layer comprises a catalyst material containing one or more active ingredients selected from the group consisting of Pt, Pd, Ru, Rh, Rd, Ir, V, W, Mo, Ni, Co, Fe, Cr, Cu, Mn, and Ce with all pores in said zeolite being interconnected in all crystallographic directions, and with a pore size of 4 to 8 angstroms to act as a trap for HCl and elevate the concentration so that Hg that contacts the catalyst surface from the flue gas experiences elevated Cl contact, and thus higher Hg oxidation.

8. The method of claim 1, further comprising passing the flue gas through at least one additional layer containing a special-purpose catalyst selected from the group consisting of a) a catalyst for oxidation of mercury, of a composition such that reducing the temperature by 40 to 275° F. to the second stage operating temperature decreases the $SO_2$ conversion by at least a factor of ½, but affects Hg oxidation either only marginally or increases Hg oxidation, said special-purpose catalyst having a formulation preferential to Hg oxidation, b) a catalyst for the oxidation of $NH_3$ to either NO or $N_2$, said special-purpose catalyst having a formulation preferential for $NH_3$ oxidation, so that said reduction in temperature by 40 to 275° F. to the second stage operating temperature decreases the $SO_2$ conversion by at least a factor of ½, and provides $NH_3$ oxidation of at least 10%, and c) a catalyst that is a combination of a) and b).

9. The method of claim 1, further comprising the water heater preheating boiler feedwater.

10. The method of claim 9, wherein the water heater is a boiler economizer.

11. A method for the selective catalytic reduction of nitrogen oxides, comprising:
    introducing a reducing agent into a flue gas containing nitrogen oxides;

after the introducing the reducing agent into the flue gas and before passing the flue gas and reducing agent through a heat exchanger, passing the flue gas, at a first gas velocity, containing the introduced reducing agent through at least a first layer of nitrogen oxide reducing catalyst where an amount of nitrogen oxides in said flue gas is reduced;

after the passing the flue gas through the at least the first layer of nitrogen oxide reducing catalyst, passing the flue gas with the reduced amount of nitrogen oxides, at a second gas velocity that is higher than the first gas velocity, through at least one interstage heat exchanger that is separate from catalyst layers and that removes heat from the flue gas and also mixes the flue gas and the reducing agent; wherein the heat removed from the flue gas is transferred to a water heater; and after the passing the flue gas through the at least one interstage heat exchanger, passing the flue gas from which the heat was removed through at least one additional layer of nitrogen oxide reducing catalyst where an additional amount of nitrogen oxides in the flue gas is reduced.

12. The method of claim 11 wherein said at least one interstage heat exchanger that lowers flue gas temperature, and acts as a mixing body to lower the standard deviation of the $NH_3/NO$ ratio entering catalyst layers after the first catalyst layer, thus providing a higher amount of consumption of both ammonia and NOx in a reactor than would be achieved in the absence of the at least one interstage heat exchanger.

13. The method of claim 12 wherein the at least one interstage heat exchanger transfers 25-275° F. of temperature.

14. The selective catalytic reduction method of claim 13, wherein a lower flue gas temperature by a magnitude of 25-275° F. lowers the oxidation of $SO_2$ across each layer by a factor of 20-90%, and/or increases the oxidation of mercury across each layer by a value of 20 to 300%, both compared to the rate that would normally be observed without the reduced flue gas temperature.

15. The method of claim 11 wherein the $NH_3/NO$ ratio is about 1:1.

16. The method of claim 11, further comprising, before passing the flue gas through the at least one additional catalyst layer, passing the flue gas through a separate static mixing device to mix reducing agent and NO, further mixing the partially reacted $NH_3$ and NO.

17. The method of claim 11, further comprising passing the flue gas through at least one additional layer containing a special-purpose catalyst selected from the group consisting of a) a catalyst for oxidation of mercury, of a composition such that reducing the temperature by 40 to 275° F. to the second stage operating temperature decreases the $SO_2$ conversion by at least a factor of ¼, but affects Hg oxidation either only marginally or alternatively increases Hg oxidation, said special-purpose catalyst having a formulation preferential to Hg oxidation, b) a catalyst for the oxidation of $NH_3$ to either NO or $N_2$, said special-purpose catalyst having a formulation preferential for $NH_3$ oxidation, so that said reduction in temperature by 40 to 275° F. to the second stage operating temperature decreases the $SO_2$ conversion by at least a factor of ¼, and provides $NH_3$ oxidation of at least 10%, and c) a catalyst for the oxidation of NO to $NO_2$, said special-purpose catalyst having a formulation preferential for NO oxidation, so that said reduction in temperature by 40 to 275° F. to the second stage operating temperature provides for oxidation of NO to $NO_2$ of at least 10% and d) a catalyst for any combination of a) and b) and c).

18. The method of claim 17, wherein the additional layer comprises a catalyst material containing one or more active ingredients selected from the group consisting of Pt, Pd, Ru, Rh, Rd, Ir, V, W, Mo, Ni, Co, Fe, Cr, Cu, Mn, and Ce with all pores in said zeolite being interconnected in all crystallographic directions, and with a pore size of 4 to 8 angstroms to act as a trap for HCl and elevate the concentration so that Hg that contacts the catalyst surface from the flue gas experiences elevated Cl contact, and thus higher Hg oxidation.

19. The method of claim 11, further comprising passing the flue gas through at least one additional layer containing a special-purpose catalyst selected from the group consisting of a) a catalyst for oxidation of mercury, of a composition such that reducing the temperature by 40 to 275° F. to the second stage operating temperature decreases the $SO_2$ conversion by at least a factor of ½, but affects Hg oxidation either only marginally or increases Hg oxidation, said special-purpose catalyst having a formulation preferential to Hg oxidation, b) a catalyst for the oxidation of $NH_3$ to either NO or $N_2$, said special-purpose catalyst having a formulation preferential for $NH_3$ oxidation, so that said reduction in temperature by 40 to 275° F. to the second stage operating temperature decreases the $SO_2$ conversion by at least a factor of ½, and provides $NH_3$ oxidation of at least 10%, and c) a catalyst that is a combination of a) and b).

20. The method of claim 11, further comprising the water heater preheating boiler feedwater.

21. The method of claim 20, wherein the water heater is a boiler economizer.

* * * * *